US007668671B1

(12) United States Patent
Gristina

(10) Patent No.: US 7,668,671 B1
(45) Date of Patent: Feb. 23, 2010

(54) SYSTEM FOR MANAGING RESOURCE INFRASTRUCTURE AND RESOURCE CONSUMPTION IN REAL TIME

(76) Inventor: Dario Gristina, c/o Genergy, 353 W. 48th St., 4th Floor, New York, NY (US) 10036

(*) Notice: Subject to any disclaimer, the term of this patent is extended or adjusted under 35 U.S.C. 154(b) by 176 days.

(21) Appl. No.: 11/788,465

(22) Filed: Apr. 20, 2007

Related U.S. Application Data

(63) Continuation of application No. 10/051,542, filed on Jan. 17, 2002, now Pat. No. 7,069,161, and a continuation of application No. 11/338,410, filed on Jan. 24, 2006, now abandoned.

(51) Int. Cl.
*G01R 21/00* (2006.01)
(52) U.S. Cl. .................................. 702/61; 700/291
(58) Field of Classification Search ............ 702/60–62, 702/176–177, 182, 185, 187–188; 705/400, 705/412; 340/870.02; 700/291, 295–297
See application file for complete search history.

(56) References Cited

U.S. PATENT DOCUMENTS

| | | | | |
|---|---|---|---|---|
| 5,819,092 | A * | 10/1998 | Ferguson et al. | 717/113 |
| 6,598,056 | B1 * | 7/2003 | Hull et al. | 707/104.1 |
| 6,965,319 | B1 * | 11/2005 | Crichlow | 340/870.02 |
| 7,069,161 | B2 * | 6/2006 | Gristina et al. | 702/61 |
| 2001/0010032 | A1 * | 7/2001 | Ehlers et al. | 702/62 |
| 2003/0078677 | A1 * | 4/2003 | Hull et al. | 700/1 |
| 2004/0049524 | A1 * | 3/2004 | Toyota et al. | 707/203 |

* cited by examiner

*Primary Examiner*—Eliseo Ramos Feliciano
*Assistant Examiner*—Mary C Baran
(74) *Attorney, Agent, or Firm*—Levisohn Berger LLP

(57) ABSTRACT

The present invention provides a system, method and medium for monitoring and managing the resource consumption and resource infrastructure of at least one building in real time. The present invention integrates field studies of at least one building's resource consumption and resource infrastructure with real time resource usage. The integrated information can be operated on by the analytical tools of the present invention to forecast future resource consumption and obtain resource market information. The integrated resource information can also be used to feed back into the building resource management system of at least one building to control the resource states of the at least one building. The present invention provides a graphical user interface for monitoring and managing the components of the resource consumption and resource infrastructure of at least one building. The system, method and medium of the present invention can communicate with a resource trading platform that facilitates the buying and selling of resources. The system, method and medium of the present invention can aggregate the resource consumption and resource infrastructure of multiple buildings which can then be managed through the graphical user interface of the present invention.

36 Claims, 42 Drawing Sheets gEnergy One
ACME Demo Properties
NY
├─ Building A
├─ Building B
├─ Building C
├─ Building D
└─ Building E
    └─ Demo Portfolio
        ├─ Load Management
        ├─ ERI Management Profile
        ├─ Cost Analysis
        └─ Utilities (c) Genergy 2001

USER: xxxxx

[Reload]
[Log Off]

ACME Demo Properties

Electric Rent Inclusion Management

Yearly ERI Revenue  $XX,XXX.XX
Monthly ERI Revenue $XX,XXX.XX
ERI Sq-Ft           $XX,XXX.XX
Average ERI $/Sq-Ft $XX,XXX.XX

| # | Building Name | ERI Tenants | Yearly Revenue | Monthly Revenue | Tot Sq-Ft | | AVG $/Sq-Ft |
|---|---|---|---|---|---|---|---|
| xx | xx Penn Plaza | xxx | $xx,xxx.xx | $xx,xxx.xx | xx,xxx | xx.xx% | $x.xx |
| xx | xx Penn Plaza | xxx | $xx,xxx.xx | $xx,xxx.xx | xx,xxx | xx.xx% | $x.xx |
| xx | xx Penn Plaza | xxx | $xx,xxx.xx | $xx,xxx.xx | xx,xxx | xx.xx% | $x.xx |
| xx | xx Penn Plaza | xxx | $xx,xxx.xx | $xx,xxx.xx | xx,xxx | xx.xx% | $x.xx |
| xx | xx Penn Plaza | xxx | $xx,xxx.xx | $xx,xxx.xx | xx,xxx | xx.xx% | $x.xx |
| xx | xx Penn Plaza | xxx | $xx,xxx.xx | $xx,xxx.xx | xx,xxx | xx.xx% | $x.xx |
| xx | xx Penn Plaza | xxx | $xx,xxx.xx | $xx,xxx.xx | xx,xxx | xx.xx% | $x.xx |
| xx | xx Penn Plaza | xxx | $xx,xxx.xx | $xx,xxx.xx | xx,xxx | xx.xx% | $x.xx |
| xx | xx Penn Plaza | xxx | $xx,xxx.xx | $xx,xxx.xx | xx,xxx | xx.xx% | $x.xx |
| xx | xx Penn Plaza | xxx | $xx,xxx.xx | $xx,xxx.xx | xx,xxx | xx.xx% | $x.xx |
| xx | xx Penn Plaza | xxx | $xx,xxx.xx | $xx,xxx.xx | xx,xxx | xx.xx% | $x.xx |
| xx | xx Penn Plaza | xxx | $xx,xxx.xx | $xx,xxx.xx | xx,xxx | xx.xx% | $x.xx |
| xx | xx Penn Plaza | xxx | $xx,xxx.xx | $xx,xxx.xx | xx,xxx | xx.xx% | $x.xx |

FIGURE 8

| | xx | xx Penn Plaza | | | Total no. of ERI Tenants: | | | xxx | |
|---|---|---|---|---|---|---|---|---|---|
| | | ACME Management | | | Total of ERI Sq-Ft: | | | xx,xxx.xx | |
| | | | | | Total of ERI Monthly Charge: | | | $xx,xxx.xx | |
| | | | | | Total of ERI Yearly Charge: | | | $xx,xxx.xx | |
| | | | | | AVG of ERI $/Sq-Ft.: | | | $x.xx | |

| Tenant # | Tenant Name | Sq-Ft | Montly Charge | Yearly Charge | $/Sq-Ft | Lease Exp Date | Move Out Date |
|---|---|---|---|---|---|---|---|
| XX_XX | XYZ INC | xx,xxx | $xx,xxx.xx | $xx,xxx.xx | $x.xx | xx/xx/xxxx | xx/xx/xxxx |
| XX_XX | XYZ Services | xx,xxx | $xx,xxx.xx | $xx,xxx.xx | $x.xx | xx/xx/xxxx | xx/xx/xxxx |
| XX_XX | XYZ Products | xx,xxx | $xx,xxx.xx | $xx,xxx.xx | $x.xx | xx/xx/xxxx | xx/xx/xxxx |
| XX_XX | XYZ Leasign | xx,xxx | $xx,xxx.xx | $xx,xxx.xx | $x.xx | xx/xx/xxxx | xx/xx/xxxx |
| XX_XX | XYZ Consult | xx,xxx | $xx,xxx.xx | $xx,xxx.xx | $x.xx | xx/xx/xxxx | xx/xx/xxxx |
| XX_XX | XYZ Mgmt | xx,xxx | $xx,xxx.xx | $xx,xxx.xx | $x.xx | xx/xx/xxxx | xx/xx/xxxx |
| XX_XX | XYZ INC | xx,xxx | $xx,xxx.xx | $xx,xxx.xx | $x.xx | xx/xx/xxxx | xx/xx/xxxx |

| Tenant # | Date Event | % Rate | % MAC | Charge | Note |
|---|---|---|---|---|---|
| XX_XX | xx/xx/xxxx | xx.xx% | xx.xx% | $xxx.xx | xxx xxxxx xxxxx xxxxxx |
| XX_XX | xx/xx/xxxx | xx.xx% | xx.xx% | $xxx.xx | xxx xxxxx xxxxx xxxxxx | gEnergy One
ACME Management  — 220
NY
- xx Penn Plaza
  - Load Management
  - ERI Management Profile
  - Power Grid Identification
  - Power Availability
  - Power Chart
  - Revenue Profile
  - Over Time HVAC
  - PLP Profile
  - IRI
  - Meter Services
- xx UN Plaza
- xx 5th Ave
- xx Broadway
- xx E 78th Street
- xx Madison Ave
- xx Park Ave
- xx Chambers Street
- xx Lexington Ave

NJ (c) Genergy 2001

USER: xxxxx

Reload
Log Off

FIGURE 9

FIG. 10-A
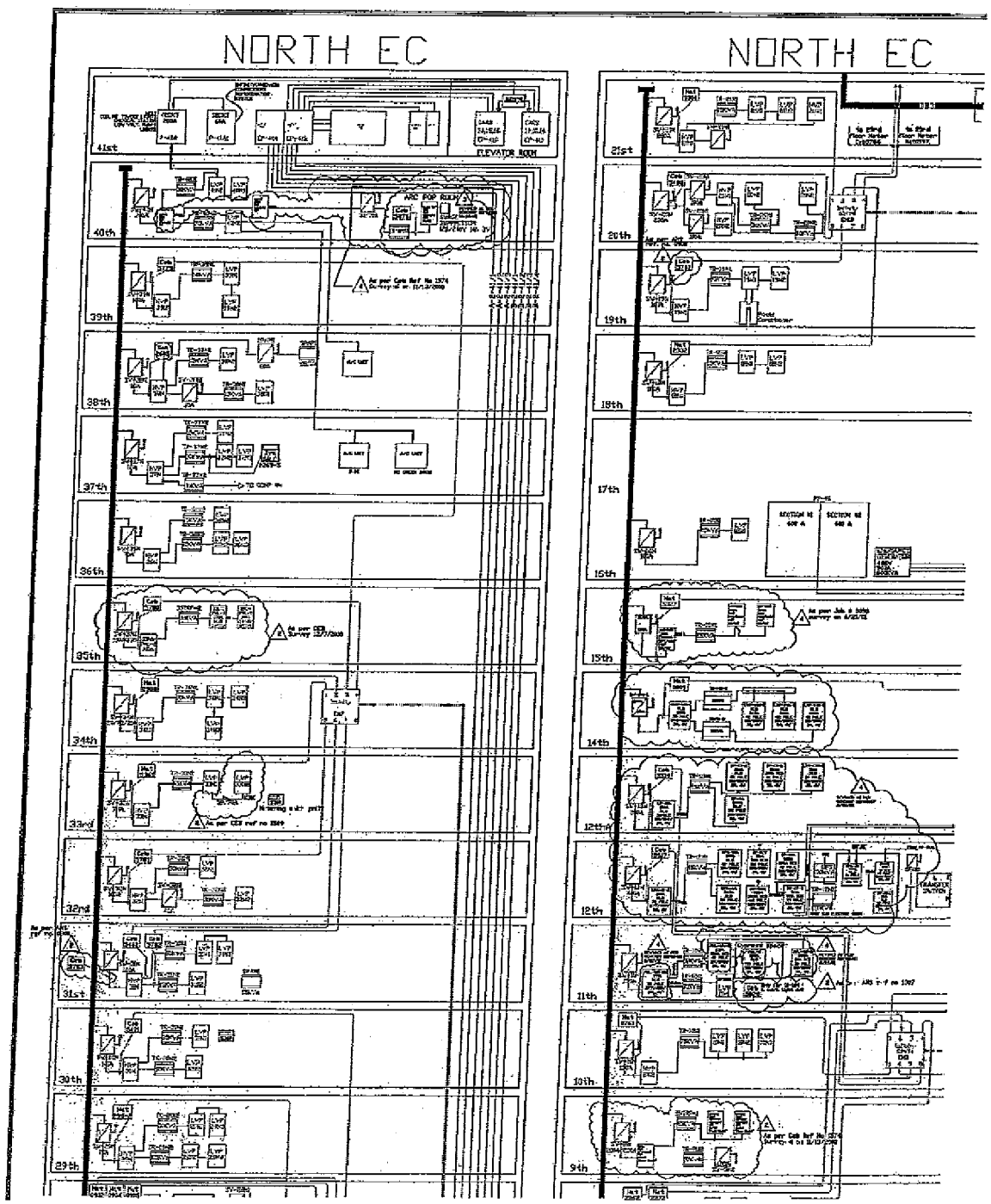

FIG. 10-B
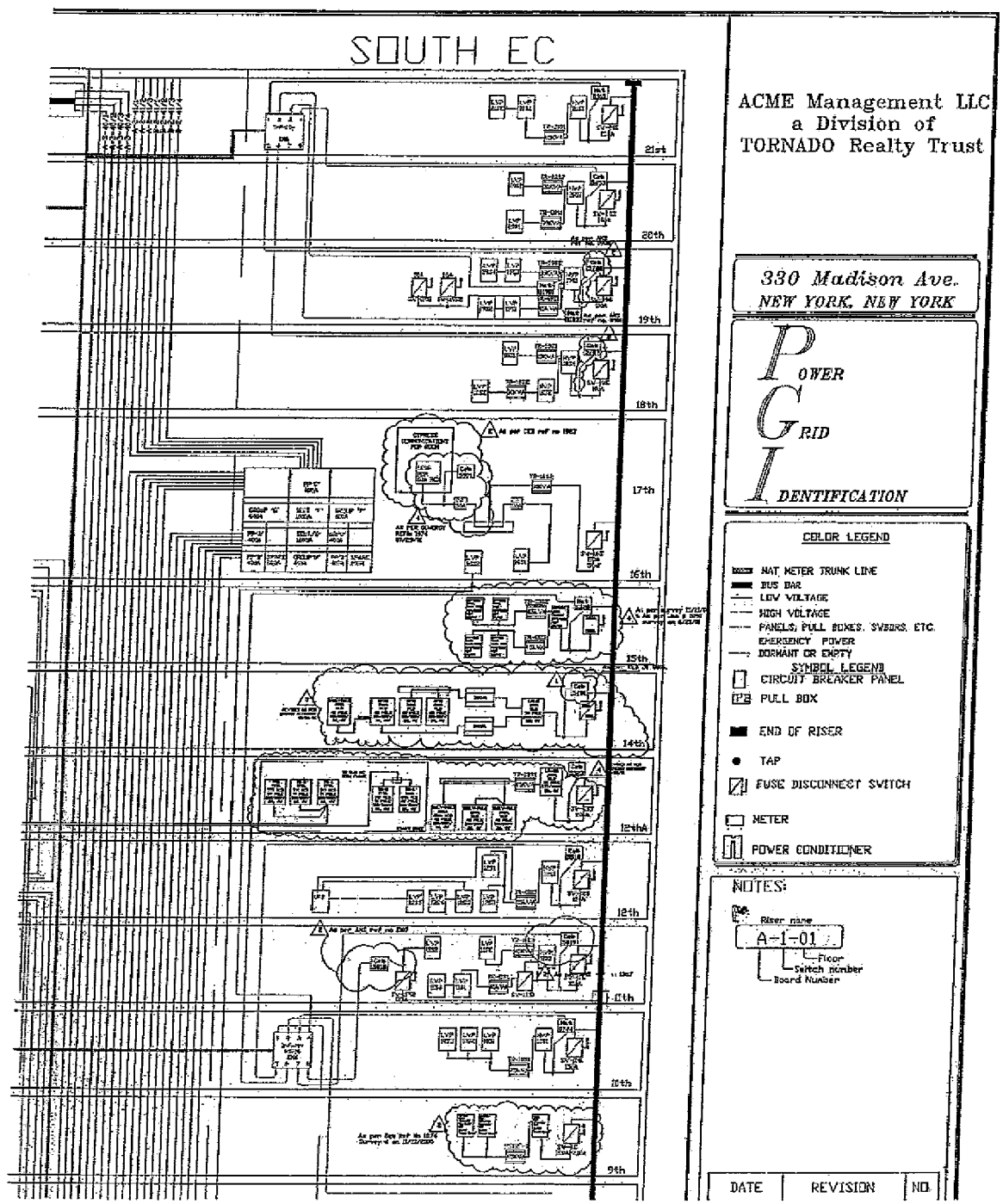

FIG. 10-C
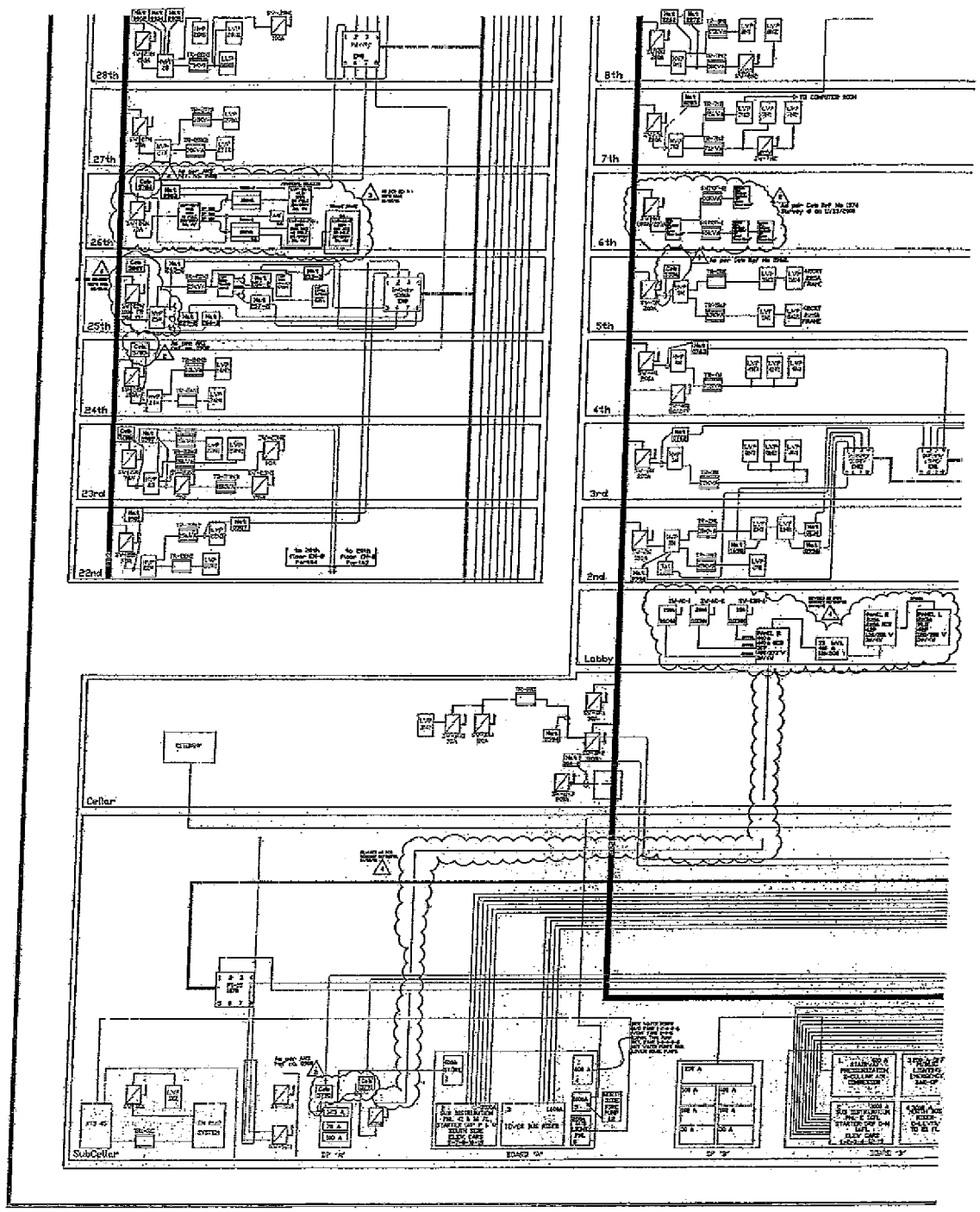

FIG. 10-D
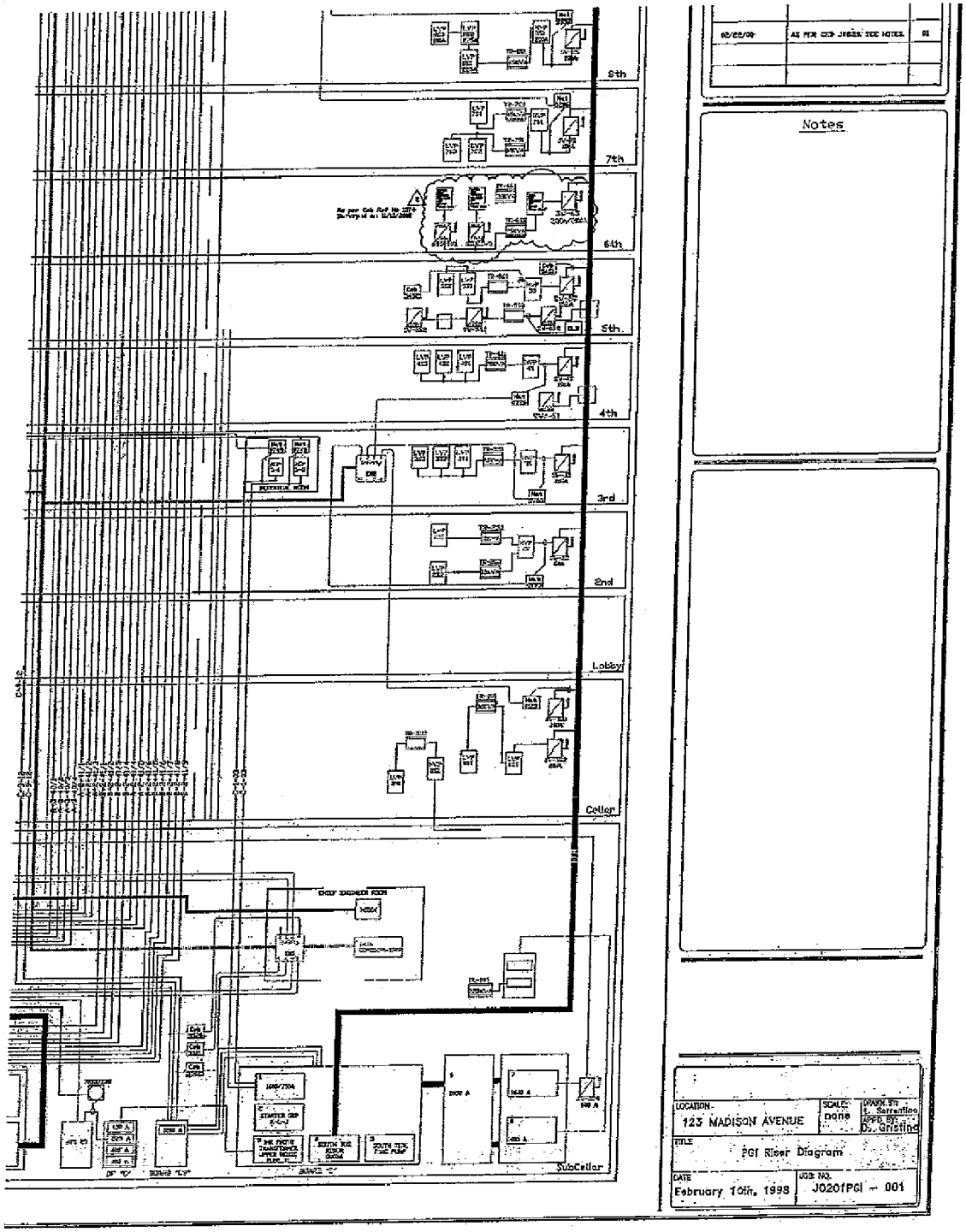

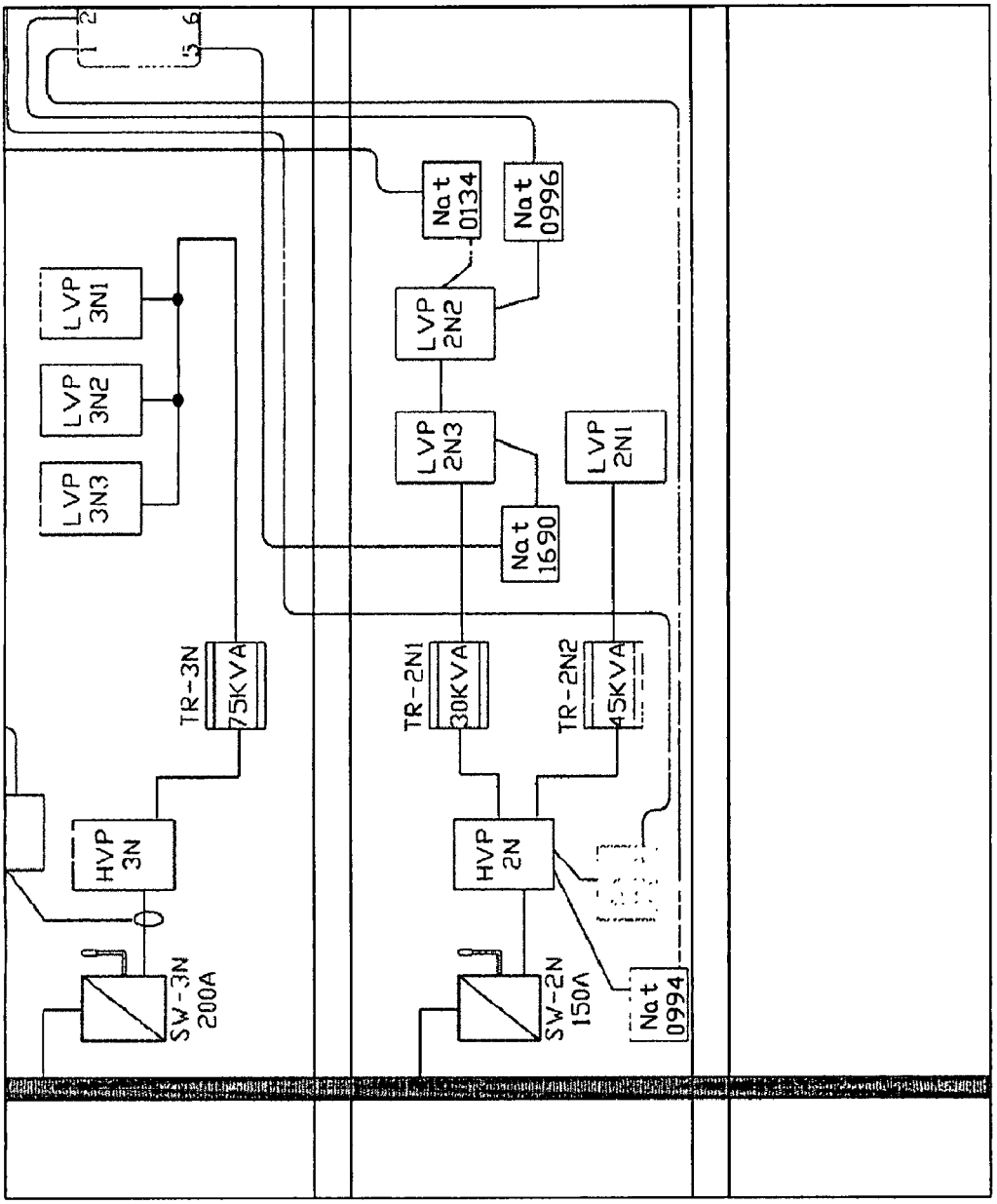
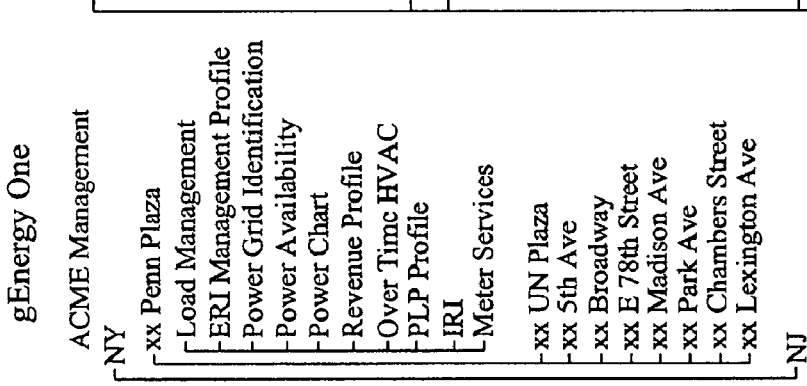
FIGURE 12

Meter Details

| Bill Period | Previous | Current | On Peak | Off Peak | Kwhr | Demand |
|---|---|---|---|---|---|---|
| xxxx/x | xx,xxx | xx,xxx | xxx | xxx | x,xxx | x.xx |
| xxxx/x | xx,xxx | xx,xxx | xxx | xxx | x,xxx | x.xx |
| xxxx/x | xx,xxx | xx,xxx | xxx | xxx | x,xxx | x.xx |
| xxxx/x | xx,xxx | xx,xxx | xxx | xxx | x,xxx | x.xx |
| xxxx/x | xx,xxx | xx,xxx | xxx | xxx | x,xxx | x.xx |
| xxxx/x | xx,xxx | xx,xxx | xxx | xxx | x,xxx | x.xx |
| xxxx/x | xx,xxx | xx,xxx | xxx | xxx | x,xxx | x.xx | gEnergy One

ACME Management

NY
- xx Penn Plaza
  - Load Management
  - ERI Management Profile
  - Power Grid Identification
  - Power Availability
  - Power Chart
  - Revenue Profile
  - Over Time HVAC
  - PLP Profile
  - IR1
  - Meter Services
- xx UN Plaza
- xx 5th Ave
- xx Broadway
- xx E 78th Street
- xx Madison Ave
- xx Park Ave
- xx Chambers Street
- xx Lexington Ave

NJ (c) Genergy 2001

USER: xxxxx

Reload   Log Off

FIGURE 13

XXXXX - MARK STATIONARIES

| Period | Energy Charge | Demand Charge | Admin Fee | Service Fee | Sales Tax | Total Amt |
|---|---|---|---|---|---|---|
| xxxx/x | $xxx.xx | $xx.xx | x.xx% | $xx.xx | $xx.xx | $xxx.xx |

| Meter | On Peak KWH | Off Peak KWH | KWH | Demand |
|---|---|---|---|---|
| NAT XXXX | xxx | xxx | x,xxx | x |
| NAT XXXX | xxx | xxx | xxx | x |
| Totals | x,xxx | x,xxx | x,xxx | x | gEnergy One

ACME Management
NY
- xx Penn Plaza
  - Load Management
  - ERI Management Profile
  - Power Grid Identification
  - Power Availability
  - Power Chart
  - Revenue Profile
  - Over Time HVAC
  - PLP Profile
- IRI
  - Meter Services
- xx UN Plaza
- xx 5th Ave
- xx Broadway
- xx E 78th Street
- xx Madison Ave
- xx Park Ave
- xx Chambers Street
- xx Lexington Ave
NJ (c) Genergy 2001

USER: xxxxx

Reload
Log Off

FIGURE 14 gEnergy One

ACMF Management

├─ NY
│   ├─ xx Penn Plaza
│   │   ├─ Load Management
│   │   ├─ ERI Management Profile
│   │   ├─ Power Grid Identification
│   │   ├─ Power Availability
│   │   ├─ Power Chart
│   │   ├─ Revenue Profile
│   │   ├─ Over Time HVAC
│   │   ├─ PLP Profile
│   │   ├─ IRI
│   │   └─ Meter Services
│   ├─ xx UN Plaza
│   ├─ xx 5th Ave
│   ├─ xx Broadway
│   ├─ xx E 78th Street
│   ├─ xx Madison Ave
│   ├─ xx Park Ave
│   ├─ xx Chambers Street
│   └─ xx Lexington Ave
└─ NJ

| Date xx/xx/xxxx | | Time xx:xx:xx | |
|---|---|---|---|
| Volt A | xxx.xx | VOLT A-B | xxx.xx |
| Amp A | xx.xx | KW A | x.xx |
| KVAR A | .xx | PF A | .xxxx |
| VThd A % | x.xx | AThd A % | xx.xx |
| Volt B | xxx.xx | VOLT B-C | xxx.xx |
| Amp B | x.xx | KW B | .xx |
| KVAR B | .xx | PF B | .xxxx |
| VThd B % | x.xx | AThd B % | xx.xx |
| Volt C | xxx.xx | VOLT C-A | xxx.xx |
| Amp C | x.xx | KW C | .xx |
| KVAR C | .xx | PF C | .xxxx |
| VThd C % | x.xx | AThd C % | xx.xx |
| KW ABC | x.xx | KVARL ABC | .xx |
| KVARC ABC | .xx | PF ABC | .xxxx |
| COS ABC | x.xx | Freq. Hz. | xx.xx |
| KWH ABC | xxxx.xx | KVARLH ABC | xxxx.xx |
| KVARCH ABC | xx.xx | KVA ABC | x.xx |
| | | DEMAND | x.xx |

FIGURE 15

(c) Genergy 2001

USER: xxxxx   Reload   Log Off

Your Building - MEP Upgrade

Construction Drawings as of February 14, 2001

ELECTRICAL

E1 - Electrical Service to Floors 8-9-10-12
E2 - Sub-Basement Electrical Plan
E3 - Electrical Plan Basement
E4 - 7th Floor Electrical Plan and Details
E5 - Electric Closet Plans
E6 - Mechanical Room Feeders
E7 - Electrical Roof Plan

PLUMBING

P1 - Domestic Water Riser
P2 - Drain Vent Riser
P3 - Sub Basement Plan
P4 - Basement Plan
P5 - 4th Floor Plan
P6 - 16th Floor Plan
P7 - Mechanical Schedule

MECHANICAL  /550

M1 - Condenser Water Piping Riser Diagram
M2 - CWP - Basement Plan
M3 - CWP - 4th Floor Plan
M4 - CWP - 12th Floor Plan (typ of 8,9,10,12)
M5 - CWP - 16th Floor Plan
M6 - CWP Roof
M7 - Mechanical Details #1
M8 - Mechanical Details #2
M9 - Mechanical Details #3
M10 - Mechanical Schedules

SPECIFICATIONS

FIGURE 16

XX PENN PLAZA

HOURLY OVERTIEM COOLING

All Floors

| ELECTRIC: | |
|---|---:|
| KWHR: 2888 @ $ 0.06139 | $177.29 |

— 700

| STEAM: | |
|---|---:|
| MLBS: 32.3 @ $ 10.46 | $337.86 |

— 710

| WATER: | |
|---|---:|
| 6240GPM x60Min.x2%Evap=7488<br>Gallons/748= 10.01 CCF @3.37 | $ 33.73 |

— 715

| REPAIRS & MAINTENANCE: | |
|---|---:|
| $527,000 Per Annum =<br>3440 Hours Per Annum | $153.20 |

— 720

| LABOR: | |
|---|---:|
| One Engineer Per Hour: | $ 97.50 |

— 725

TOTAL COOLING PER HOUR:        $ 799.58

FIGURE 27 gEnergy One

ACME Management
NY
— xx Penn Plaza
  — Load Management
  — ERI Management Profile
  — Power Grid Identification
  — Power Availability
  — Power Chart
  — Revenue Profile
  — Over Time HVAC
  — PLP Profile
  — IRI
  — Meter Services
— xx UN Plaza
— xx 5th Ave
— xx Broadway
— xx E 78th Street
— xx Madison Ave
— xx Park Ave
— xx Chambers Street
— xx Lexington Ave
NJ (c) Genergy 2001

USER: xxxxx

Reload
Log Off

CLIENT — 755   XYZ Realty Company
ADDRESS — 760  XX Penn Plaza
                New York, NY 10019
PREMISES — 765 Common Area KW             xxx.x
KWHR           xxxxxx — 770
UTILITY RATE   Consolidated Edison SC-411 || Rate in effect Jan 2000

ENERGY         On-Peak Kwhr   xxxxx  @  $x.xxxx   $xx.xxx.xx
               Off-Peak Kwhr  xxxxx  @  $x.xxxx   $xx.xxx.xx — 775

DEMAND         KW             xxx.x  @  $xx.xx    $xx.xxx.xx — 780

FUEL ADJUSTMENT  Kwhr         xxxx   @  $x.xxxxx  $xx.xxx.xx — 785

Sub-Total           $xx.xxx.xx

GROSS RECEIPT TAX   x.xxx%                        $x.xxx.xx — 790

Sub-Total           $xx.xxx.xx

SALES TAX           x.xx%                         $x.xxx.xx — 795
                    TOTAL COST FOR CHARGE PER MONTH                                  $xxx.xxx.xx — 798
       800  750

| rates | fuel tax | jan | feb | mar | apr | may | jun | jul | aug | sep | oct | nov | dec |

FIGURE 28

INFRARED RADIOMETER INSPECTION

| LP-9-B | 9th FL, "B" EC |
| LP-10-B | 10th FL, "B" EC |
| MCC-D | 12th FL, Motor Control Center |
| PP-25B-3 | 25th FL, Elevator #25 | gEnergy One
ACME Management
NY
  xx Penn Plaza
    Load Management
    ERI Management Profile
    Power Grid Identification
    Power Availability
    Power Chart
    Revenue Profile
    Over Time HVAC
    PLP Profile
    IRI
    Meter Services
  xx UN Plaza
  xx 5th Ave
  xx Broadway
  xx E 78th Street
  xx Madison Ave
  xx Park Ave
  xx Chambers Street
  xx Lexington Ave
NJ (c) Genergy 2001

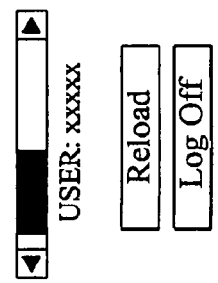

USER: xxxxx

Reload   Log Off

FIGURE 29

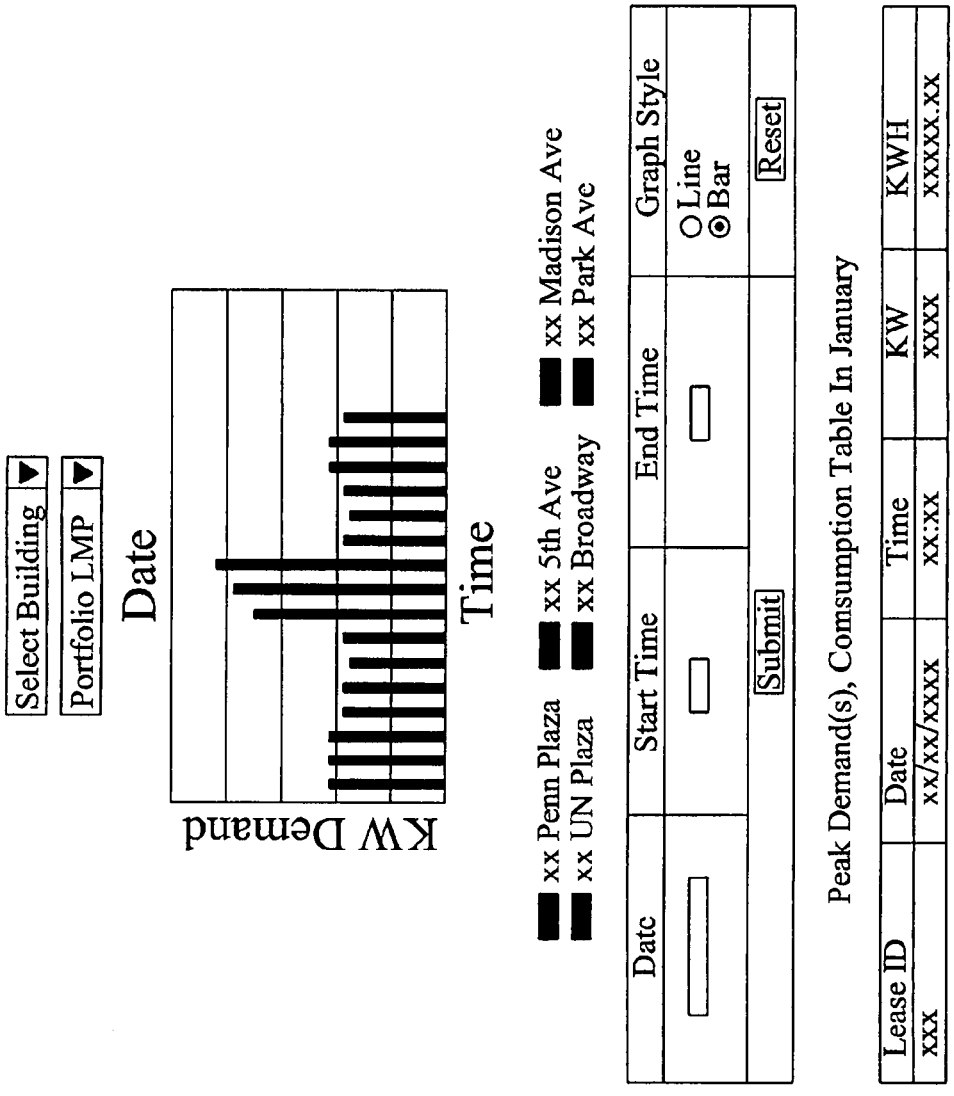
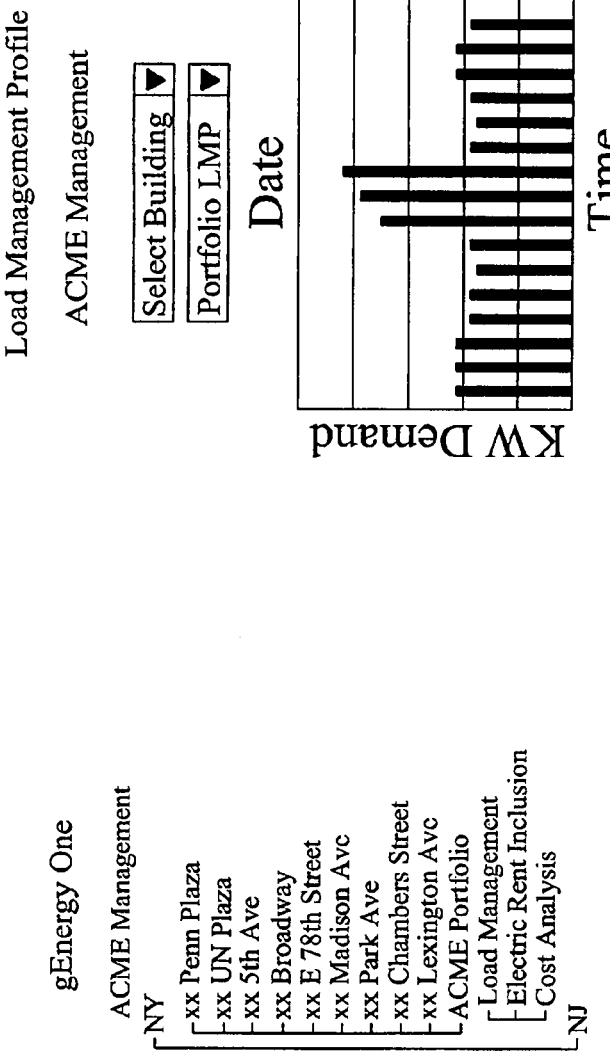
FIGURE 36

Genergy Customer Login

You are currently not logged in

GENERGY

- Back to Login

- Home
- About Us
- Services
- News & Events
- Partners

User ID: _____

Password: _____  [Login] — 1100

SYSTEM FOR MANAGING RESOURCE INFRASTRUCTURE AND RESOURCE CONSUMPTION IN REAL TIME

RELATED APPLICATIONS

This application is a continuation of U.S. Ser. No. 10/051,542, filed Jan. 17, 2002, now U.S. Pat. No. 7,069,161, issued Jun. 27, 2006 and a continuation of U.S. Ser. No. 11/338,410, filed Jan. 24, 2006 now abandoned, the contents of which are incorporated herein.

FIELD OF THE INVENTION

This invention relates to the field of building infrastructure and resource management, and in particular to a system, method, and medium that integrates a building's resource consumption data and infrastructure data into a database so as to monitor, manage and control the building's infrastructure and resource consumption in real time.

BACKGROUND OF THE INVENTION

A need presently exists for building owners and building tenants to be able to control more efficiently, both in terms of costs and conservation, their consumption of resources, such as gas, electricity, steam, and chilled water. This need is underscored by the recent wave of resource deregulation that is taking place in the marketplace, and as seen in such places as California. The resource deregulation trend is expected to continue to grow and spread to other states throughout North America. Currently both building owners and/or building management, building tenants, and resource service providers have only a patch work of information they can rely on in reviewing resource consumption. Resource consumption information currently available to building owners and building tenants fails to allow either group to effectively, both in terms of costs and conservation, control their resource consumption for two reasons: the lack of a central repository for the various types of information that relate to resource consumption and the lack of real time reporting on resource consumption and resource delivery and utilization structures.

The information available to building owners/managers and building tenants is not available in real time and typically comes in the form of aggregate billing data. Thus, the information does not permit detailed reporting, such as peak usage and/or load components that make up the billing, such as for example, by metering device or resource utilization structure. To further complicate matters, information regarding resource consumption for a particular building or tenant typically comes from several disparate sources. For example, the building owner/manager typically receives an aggregate utility bill for the entire building from a resource service provider. This aggregate bill is then divided among the building's several tenants by the building owner/manager in a variety of ways. In some instances, each tenant has its own meter or meters which track the resource usage of the tenant. These meters, commonly called sub-meters because they are subordinate to a building's main meters, have to be read and maintained. The reading and maintaining of the sub-meters is typically done by private contractors and/or consultants.

In situations where there are no sub-meters, a study of the physical space occupied by each tenant of the building must be conducted. Contractors and/or consultants, typically independent from the contractors and/or consultants that read and maintain sub-meters, come on site to the building and arrive at an estimate, through field studies and surveys, as to a tenant's resource usage based on, for example, the square feet of a tenant's space and the number and types of equipment attached to the resource delivery structures of the building, such as risers and switches. This practice of estimating tenant resource usage is known as electric rent inclusion and requires specialized skills and knowledge to implement effectively. Both sub-metering and rent inclusion methods of resource billing require that contractors and/or consultants have knowledge of the specific details governing such billing, as set forth in a rental or lease agreement in effect between a tenant and the building owner/manager. Additionally, resource consumption for the common areas of a building, such as a lobby, also requires the use of a contractor and/or consultant, with specialized knowledge, to come on site and conduct field studies in order to provide the owner/manager of the building with resource expenses associated with such commons areas. The resource expenses are then typically passed onto the building tenants according to their lease terms.

Each of the above identified contractors and/or consultants typically operate independently from the other contractors and/or consultants, which means that the resource consumption information for the building is not centralized. Due to the fragmented nature of the information available to both building owners/managers and building tenants it is very difficult for either group (tenant or owner/manager) to manage resource demand and to define an efficient resource management program.

Moreover, if a building owner/manager or building tenant wants to remodel particular floors or office space within a building the architectural designs for the modeling project must comport with the resource delivery structures of the building.

This requires an intimate knowledge of the resource capabilities of the building, such as, for example, knowledge of a building's power risers and utility closets. This information is typically provided by an independent contractor that maintains the resource delivery structures of the building. However, each resource delivery system and/or set of systems, such as electrical power, is generally maintained by different sets of contractors. For example, the contractors that maintain a building's electrical system are typically different than the contractors that maintain a building's plumbing system.

There exists a need to be able to aggregate and access, in real time, though a single platform or system, a building's resource delivery and utilization structures and the information associated with these structures, and to use this information to monitor, manage and control the resource delivery and utilization structures and the resource consumption states of a building, buildings or other structure. Deregulation of the nation's resource providers further underscores this need. As deregulation continues to spread throughout North America, tariffs on electricity are likely to result wherein resource rates will vary hour to hour based on demand. Providing the ability to monitor and control resource consumption for a building or other structure in real time will allow building tenants and building owners/managers to manage their resource expenditures and their resource conservation efforts more efficiently. Further, centralized access to a building's resource delivery and utilization structures will allow more efficient, both in terms of costs and conservation, maintenance and usage of these structures.

SUMMARY OF THE INVENTION

In accordance with the present invention, there is provided a system, method, and a medium for incorporating resource consumption information for a single building or multiple buildings at both a macro and microscopic level, wherein the information is accessible in real time. The aggregate information on resource consumption can then be fed back into a building's or buildings' resource delivery and utilization structures to control the resource consumption for a building. The system, method and medium of the present invention additionally can generate a resource consumption or utility bill.

Further, the system, method, and medium of the present invention can interface with a resource trading platform that allows the building owner or building tenant to buy and sell resources from other buildings or resource service providers.

It is another feature and advantage of the present invention in providing a system, method and medium for monitoring and metering real time resource consumption and integrating this resource consumption information with field studies of resource infrastructure wherein the integrated information can be used to control the resource states of a building or multiple buildings.

It is another feature and advantage of the present invention in providing a system, method and medium for remotely accessing the integrated information for monitoring and management purposes.

It is another feature and advantage of the present invention in providing a graphical user interface to access and interact with the real time resource consumption and resource infrastructure data.

It is another feature and advantage of the present invention in providing analytical tools for forecasting resource usage, demand and costs and researching resource usage patterns based on geography and industry, average resource unit costs based on geography and industry, and resource demand based on geography and industry.

BRIEF DESCRIPTION OF THE DRAWINGS

FIG. 8 illustrates one way in which the graphical user interface of the present invention can be configured to display Electric Rent Inclusion data for a portfolio of buildings.

FIG. 9 illustrates one way in which the graphical user interface of the present invention can be configured to display Electric Rent Inclusion data for a selected building.

FIG. 10 illustrates one way in which the graphical user interface of the present invention can be configured to display Power Grid Identification data for a selected building.

FIG. 12 is a screen shot depicting a blow up of a selected area from the Power Grid Identification data of FIG. 10.

FIG. 13 is a screen shot depicting the meter details of a selected meter from FIG. 10.

FIG. 14 illustrates one way in which the graphical user interface of the present invention can be configured to display a utility bill for a selected tenant for a selected month linked to the individual meters associated with the selected tenant.

FIG. 15 illustrates one way in which the graphical user interface of the present invention can be configured to display operating details of a selected power quality meter as selected from the Power Grid Identification data of FIG. 10.

FIG. 16 illustrates one way in which the graphical user interface of the present invention can be configured to display available construction drawings for a selected building.

FIG. 27 illustrates one way in which the graphical user interface of the present invention can be configured to display hourly overtime cooling rates for a selected property.

FIG. 28 illustrates one way in which the graphical user interface of the present invention can be configured to display electrical billing information for the Power and Lighting usage in the public areas of the selected property.

FIG. 29 illustrates one way in which the graphical user interface of the present invention can be configured to display available Infrared Radiometer Inspection data for a selected property.

FIG. 36 illustrates one way in which the graphical user interface of the present invention can be configured to display load profiles for several geographically distinct properties.

DETAILED DESCRIPTION

Figure 1:
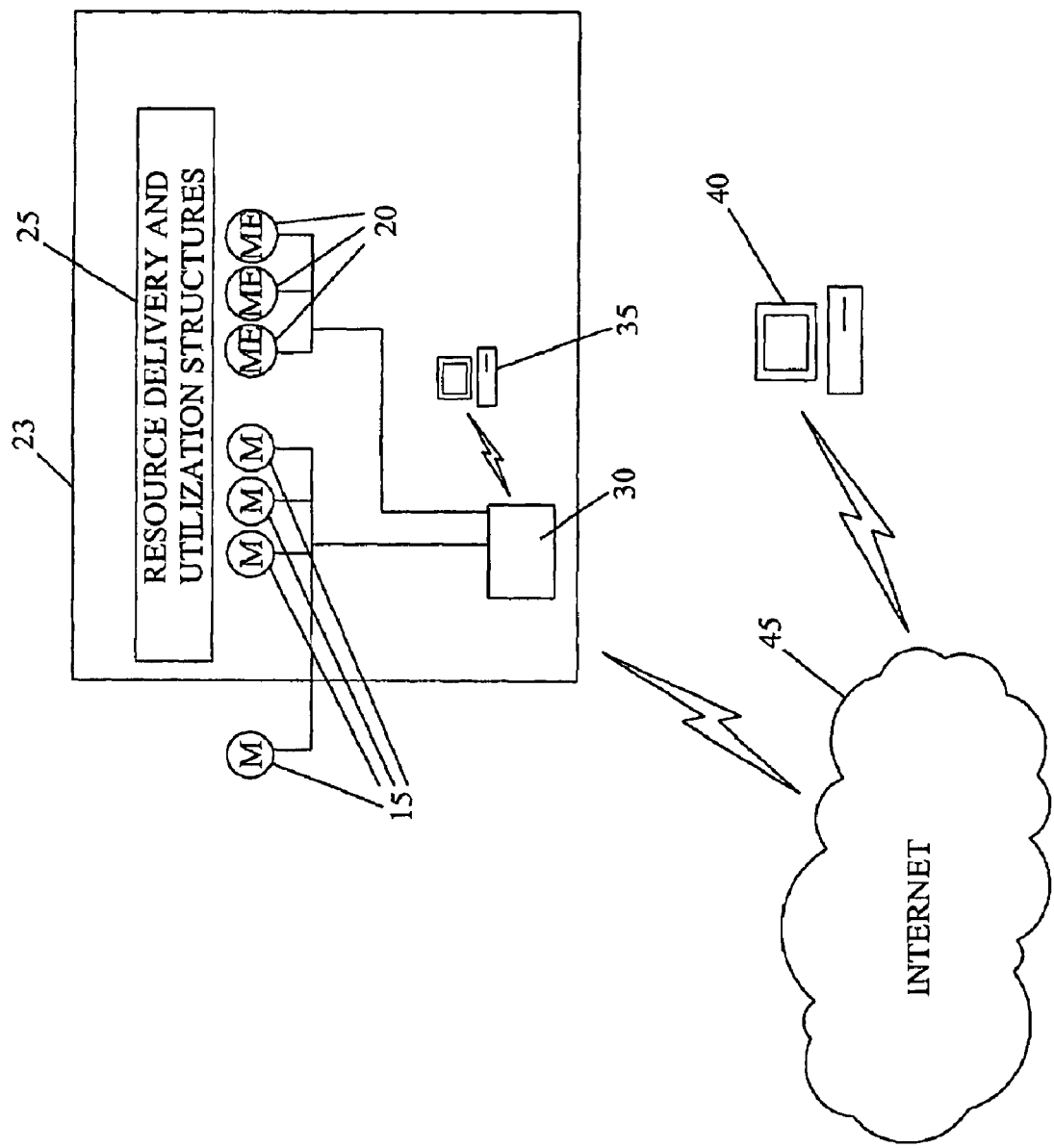
FIG. 1 illustrates a structural overview of the system of the present invention.

In the following detailed description, numerous specific details are set forth regarding the system and method and medium of the present invention and the environment in which the system and method and medium of the present invention may operate, etc., in order to provide a thorough understanding of the present invention. It will be apparent, however, to one skilled in the field of the invention that the present invention may be practiced without such specific details. In other instances, well-known components, structures and techniques have not been shown in detail to avoid unnecessarily obscuring the subject matter of the present invention. Moreover, various examples are provided to explain the operation of the present invention. It should be understood that these examples are exemplary. It is contemplated that there are other methods and systems that are within the scope of the present invention. Also, the same references numerals are used in the drawings and in the description to refer to the same elements to simplify the description.

The present invention (i) gathers and processes data on resource infrastructure and consumption for a building or buildings taken from real time sources and field studies, and (ii) aggregates the data into a database, wherein the data is made accessible through the use of both local and remote computers. In other overlapping embodiments, the aggregate data is stored across multiple databases. The present invention uses the aggregate information about a building's resource consumption and resource delivery and utilization structures, as well as information about the resource market price and variable that affect market price, to manage and optimize the distribution of resources throughout a building or buildings. Examples of the types of information that can be stored in the database, include, building infrastructure data, real time resource consumption data for the building, resource billing data for the building, resource revenue for the building, resource expenses for the building, critical load data for the building, historical resource consumption for the building, both real time and historical weather conditions local to the building, tenant specific data, environmental conditions internal to a building, and resource load profiling for the building. Results of field surveys and field studies conducted on the building can also be stored in the database. These include, for example, electric rent inclusion studies, infrared radiometer inspection studies, power grid identification studies, manual meter readings, power quality studies, public light and power surveys, overtime Heating Ventilation Air Conditioning (HVAC), mechanical and/or electrical systems calculations, such as power availability information. Once the resource consumption data id collected and processed the present invention can apply an extensive collection of forecasting tools that can allow a building owner/manager, tenant and/or user to forecast resource usage, demand, and costs based on market price, user supplied price and variables that affect market price.

The following presents a brief description of examples of the types of field studies and surveys that can be conducted on a building and stored on a database. These include, for example, Electronic Rent Inclusion (ERI), Infrared Radiometer Inspection (IRI), Power Grid Identification (PGI), Power Quality Studies, and Pubic Light and Power Survey (PLP).

Electric Rent Inclusion (ERI)

When a building does not have a sub-meter for each tenant, an estimate of a tenant's resource consumption is measured manually by conducting a survey. The terms of a tenant's lease will specify how the tenant will be billed for electricity on an ERI basis. The survey includes, for example, conducting a complete electrical survey of a tenant's space. The survey will indicate all power consuming equipment such as, for example, lights, outlets, computers and copy machines. Next Kilowatts (KW) and Kilowatt hours (KWH) used for the space are calculated. Then the proper electrical rates, which include, for example, fuel adjustment charges and miscellaneous fees, are applied to the resource consumption calculations.

Contractors and/or consultants come on site to a building and take infrared photographs or thermal scans of resource delivery systems such as, for example, circuit breakers, electrical closets, pumps, motors, HVAC equipment, etc. Thermal imaging identifies potentially hazardous thermal conditions. The identification of potentially hazardous conditions aids in the prevention of fires, equipment failures and blackouts. Thermal imaging acts as a preventive measure which can save a building owner/manager in costly repairs and replacements.

Power Grid Identification (PGI)

Power grid identification provides up to date schematics of a building's entire electrical distribution system and related electrical power availability information. The power grid identification includes, for example, riser schedules, sub-metering schedules, switchgear details, floor by floor analysis of power distribution, both base building power and tenant power usage, and identifies and labels the number and location of electrical closets, risers, high/low voltage lines, panels and metering equipment, disconnect switches and load centers, risers' primary distribution, risers' amperage capacity, and watts per square foot availability. The PGI provides valuable information that can aid in leasing activities, assist in new construction projects, identify spare power, uncover unsafe conditions and waste irregularities, reduce the risk of power failures, aid in emergency situations, and aid in running a building more efficiently.

Power quality studies provide an assessment of the efficiency of electricity being used. Power analysis equipment is used to quantify power and analyze its quality. These studies look at, for example, Volt Amperes Volt Amperes Reactive (VAR), Power Factor, amps per phase, volts per phase, peak demand, harmonic distortion, and current/voltage waveform. These studies help building owners/managers prevent costly unexpected electrical malfunctions, develop corrective power supply strategies, reduce future electrical costs, identify and eliminate harmonic distortions, extend the life of building equipment by enhancing power quality, and improve the amount of building revenue.

Public Light and Power Survey (PLP)

Consultants and/or contractors come on site to a building and conduct a field survey of all the public or common areas for the calculation of the energy consumption for all the lighting and power in these areas. The survey includes, for example, a study of all pumps, elevators, and HVAC equipment in use in the common areas of a building. The survey is conducted at fixed time intervals. Once the survey is complete, and provided the terms of the tenants' lease specifies for such, the resource bills for these areas are apportioned to the tenants. PLP surveys allow building owners/managers to recuperate resource expenditures for these areas from the tenants.

Overtime HVAC

In most buildings the lease stipulates a building's hours of operation. The lease can also provide provisions that state the tenant will be charged for resource expenses incurred after hours. Surveys and calculations can be required to determine at what rate a tenant will be charged for a building providing overtime resources. This process can require surveys of the equipment required to operate after hours. Calculations are conducted to determine the resources consumed by the equipment at the proper resource rates. Also included in the calculations are repairs to the equipment and depreciation as well as the labor required to operate the equipment. These calculations can be conducted at fixed intervals or in real time at the time of the required overtime services.

Hardware Overview

FIG. 1 provides an exemplary structural overview of the system of the present invention. The present invention employs a plurality of monitoring devices 15 (also referred to as sensors) and metering devices 20 associated with a building's 23 resource delivery and resource utilization structures 25. For example, points at which building tenants receive electricity from a building's electrical delivery structures can be affixed with a meter 20 and/or monitoring device 15. The meter 20 in turn meters the electrical usage of each tenant or a subset of a tenant's resource usage. The meters 20 are identified with a particular tenant and with a precise location. Examples of monitoring devices 15 and metering devices 20 include products from National Meter Industries, such as CVM 144 Power Quality meters, Series 7000v8 power quality four quad, three tariff meters, Series 1000 single-phase KWH metering transducers, Series 4000 three-phase KWH meters, CVMK Power quality load management, three tariff meters, as well as similar product offering from Westinghouse of Monroeville, Pa., Dranetz of Edison, N.J., and EMON Corporation of Langhom, Pa. Monitoring devices 15 and metering devices 20 are associated, for example, with the building's resource utilization and delivery structures 25 as well as the exterior of the building. These devices gather information about, for example, the loads on particular types of mechanical equipment, the loads on a building's power risers and switches, and weather conditions local to the building.

The information collected by the monitoring devices 15 and metering devices 20 about the resource states of a building is gathered and processed locally by a central data collection and processing device 30 such as, for example, a server, database systems or other universal computer. The information, once gathered and processed by the central data collection and processing device 30 is used to feed back signals into the building's monitoring devices 15 and metering devices 20 to control the resource states of the building. The central data collection and processing device 30 also receives input, 35 via, for example, optical or magnetic disks, a keypad or a wireless data transfer device, from field surveys and studies conducted on site of the building. These include, for example, electronic rent inclusion studies, infrared radiometer inspection studies, power grid identification data, manual meter readings, power quality studies, public light and power surveys, and overtime HVAC. Both the real time data and the input data from field studies and surveys are integrated, wherein the resource states of the building are determined by the integrated data and/or operating on the integrated data with forecasting tools.

Both building owners/managers and building tenants can access the integrated data through a remote 40 over the Internet 45 or through a local computer 35. Security protocols control access to information, where building tenants can only see data associated with their own resource usage while building owners or building management have unlimited access to the resource consumption of a building. Third parties, non-tenant and non-owner/manager parties, for example, resource contractors or consultants working on behalf of an owner/manager or tenant may also obtain access to the building's resource consumption data and resource delivery and utilization structures, but such access is limited to those areas of information relevant to the contractors' or consultants' duties. For example, a tenant who is considering remodeling existing space to accommodate more workstations would likely need to allow an architect or an electrical contractor access to the system for such things as the location of risers, switches, and power closets as well as information on available power.

Figure 2:
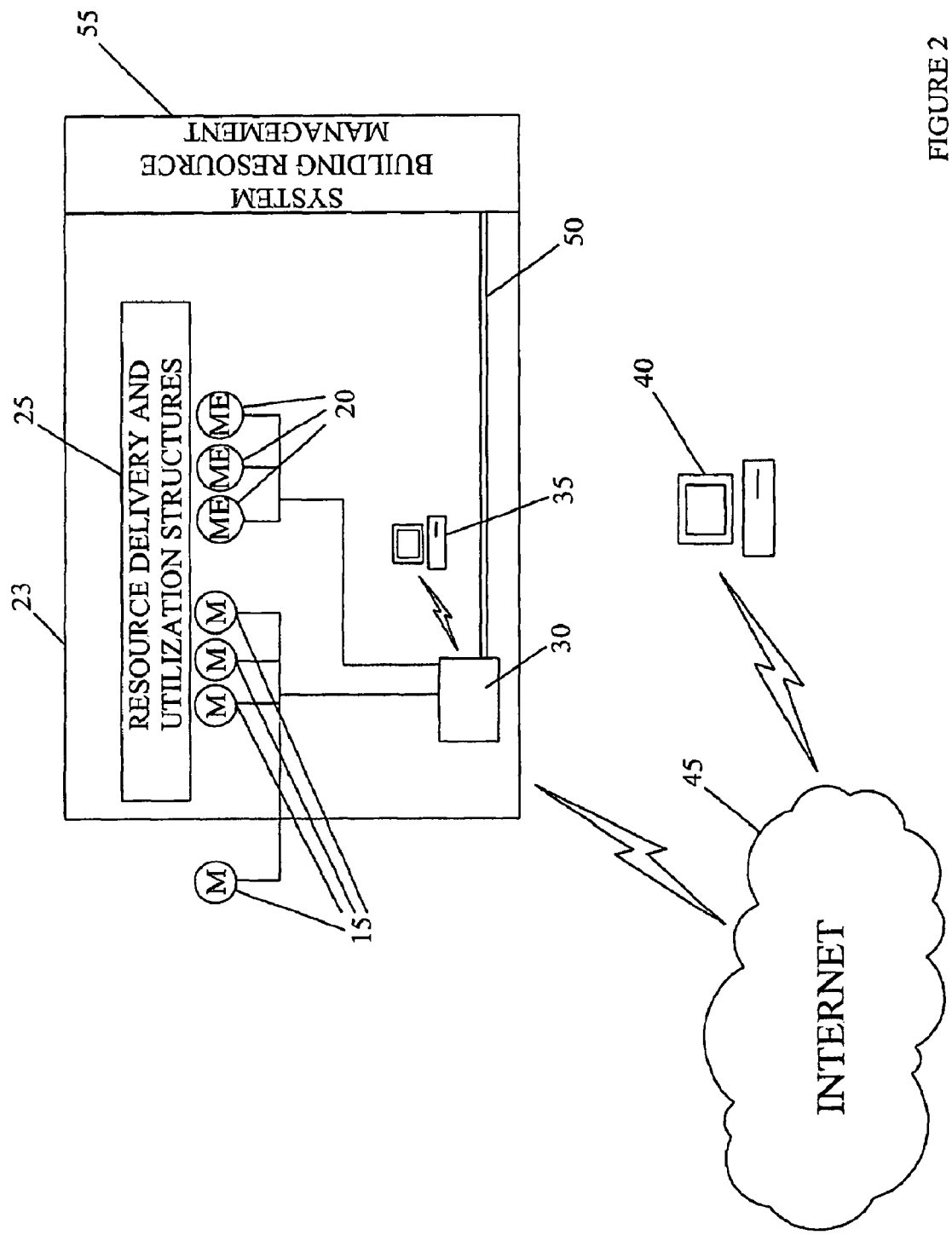
FIG. 2 illustrates a structural overview of the system of the present invention.

In other overlapping embodiments of the present invention and as shown in FIG. 2, the central data collection and processing device 30 is in communication 50 with a building's management resource system 55. The building management resource system 55 can be, for example, when a building's major functions, such as for example, HVAC, lighting, switchboard and security, are integrated into a unified control interface, where the component parts can be controlled through the interface. Examples of building management resource systems include products offered by Johnson Controls of Milwaukee, Wis., Honeywell of Morristown, N.J., and Delta Systems. It is the communication 50 between the two systems that determines and sets the resource states of the building. The central data collection and processing device 30 gathers and processes information and feeds it back to the building's management resource system 55 wherein the building's management system determines and sets the resource states for the building.

For example, monitoring devices 15 external to the building reporting on real time energy pricing information reports a spike in Kilowatt demand pricing during normal building operational hours. The central data collection and processing device 30 reports this information to the building's management resource system 55. To offset the anticipated spike in the building's energy cost, the building's management resource system 55 decreases or increases the building's thermostat for the common areas of the building. Other examples of how the system of the present invention uses monitored resource consumption data to feed back and control the resource states of a building include, monitoring devices 15 external to the building reporting on weather conditions local to the building. If these monitoring devices 15 detect a drop in temperature below a predetermined level during normal building operational hours the central data collection and processing device 30 reports this information to the building's management resource system 55. To offset the anticipated corresponding drop in the building's internal temperature the building's management resource system 55 increases the building's thermostat for the common areas of the buildings based on the information collected by the external monitoring devices. Additional examples include environmental monitors located internal to a building that monitor environmental conditions of equipment that operates best within a specific range of environmental conditions such as sever rooms. These monitors feedback into a central data collection and processing device which communicates with a building's management resource system 55 to ensure that the specified range of environmental conditions are maintained. Further, monitoring devices 15 can be used to maintain the security of a building by alerting a building's management resource system or other system user when resource usage occurs in an area that is supposed to be secure, for example if a computer is powered on in an area that is not suppose to contain any personnel.

Figure 3:
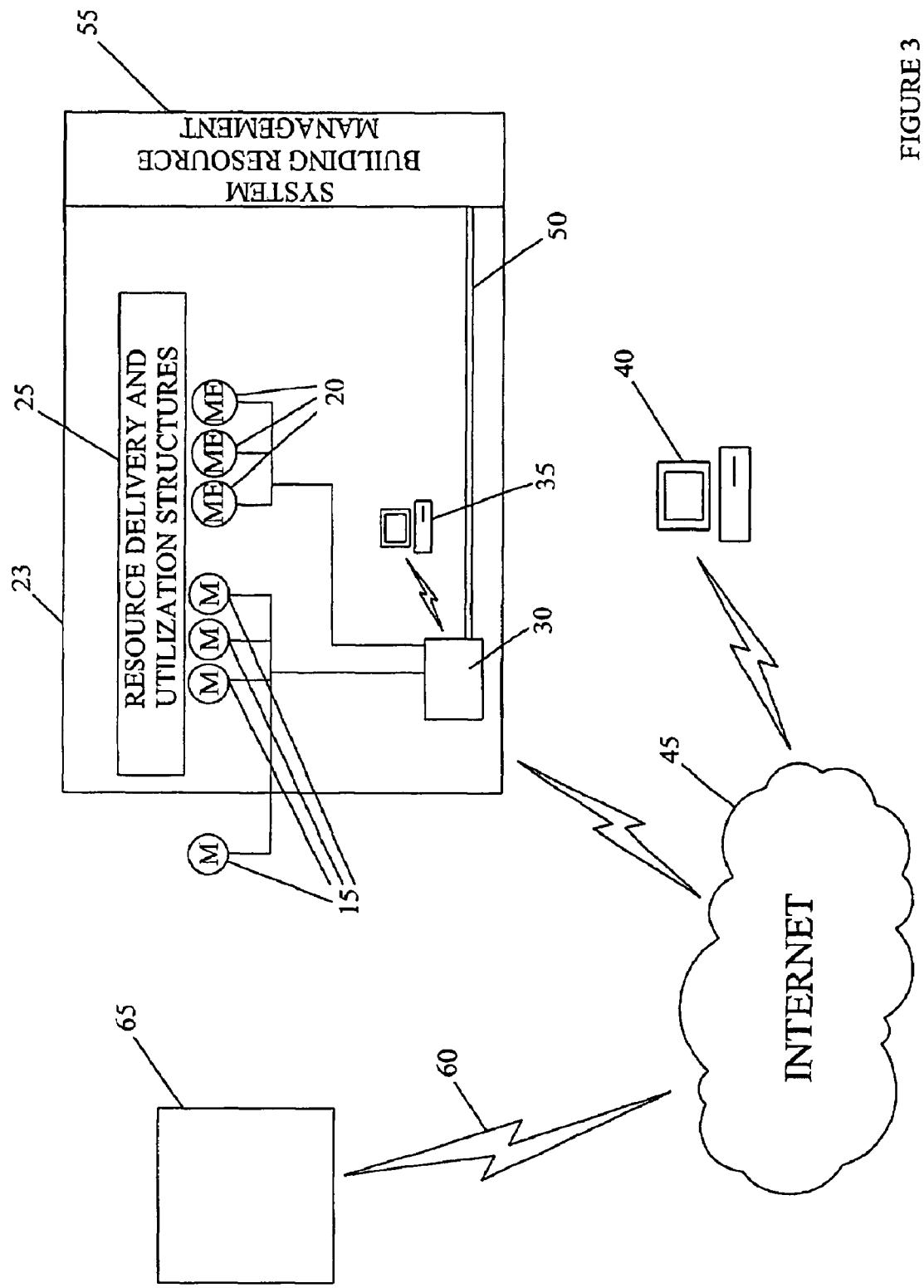
FIG. 3 illustrates a structural overview of the system of the present invention.

In other overlapping embodiments of the present invention and as shown in FIG. 3, a central data collection and processing device 30 in communication 50 with a building's management resource system 55 is in communication, 60, with a second data collection and processing device 65 remote to the building. The second data collection and processing device 65 contains information input by manual methods and collected through field studies and surveys. These include, for example, electronic rent inclusion studies, infrared radiometer inspection studies, power grid identification data, manual meter readings, power quality studies, public light and power surveys, and overtime HVAC. The second data collection and processing device 65 can be, for example, a server, database systems, or other universal computer. The second data collection and processing device 65 receives information from the data collection and processing device 30 local to the building and integrates the field survey and field study data with the real time resource state data. The second data collection and processing device 65 can send information to both the local central processing device 30 and the building's resource management system 55 which sets the resource states for the building based on the information.

Figure 4:
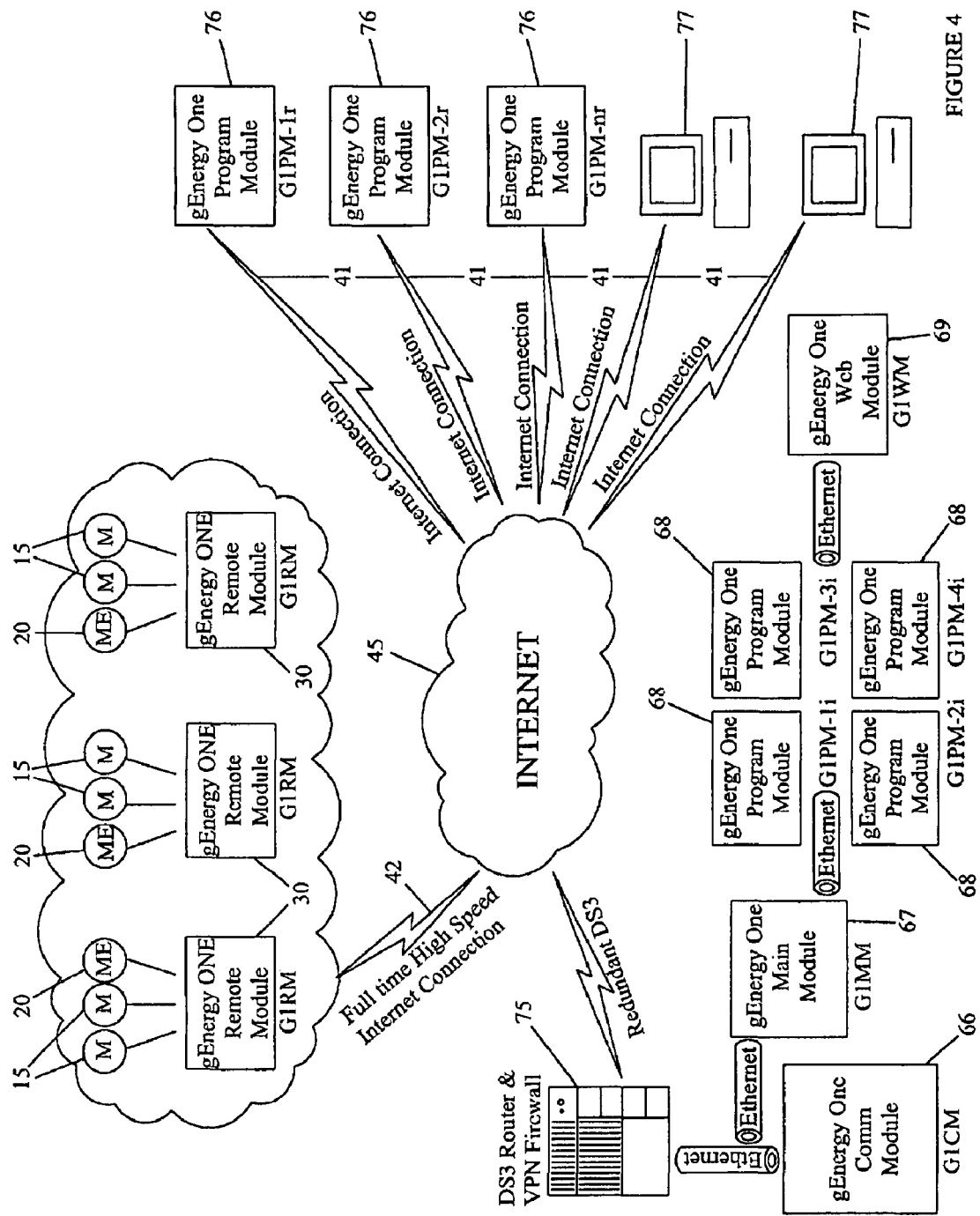
FIG. 4 illustrates a structural overview of the system of the present invention.

In other overlapping embodiments of the present invention and as shown in FIG. 4 a first data collection and processing device 30 located local to a building receives inputs from local monitoring devices 15, metering devices 20 and databases remote from the building via network connections 41 and 42 to the Internet 45 or Local Area Networks (LAN) and Wide Area Networks (WAN). The first data collection and processing device 30 local to the building also monitors critical electric loads and environmental conditions, both internal and external a building, in real-time. When a load or environmental conditions are outside a manufacturer's specifications an alert is sent to one of the databases remote to the building via a network connection 45. The first data collection and processing device 30 also communicates with the building's energy management system 55 to optimize utilization of energy driven devices in relation to energy costs and weather conditions local to the building. The monitoring devices 15 and metering devices 20 associated with the building's resource delivery and utilization systems output real time resource usage data. A second data collection and processing device 66 remote to the building coordinates meter time, which ensures that the resource rate schedule corresponds to the actual time of usage, gathers data from the first data collection and processing device 30 and monitors the first data collection and processing device 30. A third data collection and processing device 67 remote to the building converts field survey data, building infrastructure data, and resource consumption data into CAD and ODBC databases. The third data collection and processing device 67 contains the master database for all the information and data collected and monitored pertaining to resource consumption and resource infrastructure data. The third data collection and processing device 67 coordinates and integrates all data processed by the all the other data collection and processing devices into a fully relational database integrating all aspects of the building infrastructure data with, resource consumption, resource billing and revenue, resource expense, and critical load monitoring—making it all available on a real time basis through the use of computers remote and local to a building and/or the third data collection and processing device 67. A fourth data collection and processing device 68 remote to the building manipulates resource data gathered from the second data collection device 66 into resource billing data and distributes alerts gathered from the first data collection device 30 about critical loads outside manufacturer's operating specifications. The fourth data collection and processing device 68 allows users of the system to update, input and/or otherwise manipulate data on the system. A fifth data collection and processing device 69 remote to the building serves the data contained on the system to building owners/managers, building tenants and/or other users of the system. The fifth data collection and processing device 69 is where the ASP scripts reside. Remote access is controlled by security protocols 75. The system can be accessed remotely, such as from home or other field location, through the use of communication modules 76 and/or building owner/manager, building tenant machines 77.

In other overlapping embodiments of the present invention, any of the above described embodiments are connected to a resource trading platform that allows building owners and building tenants to buy and sell resources with, for example, other buildings or resource service providers. The resource trading platform can also provide for the exchange of resource consumption data, where the data can be aggregated by business type, size, resource usage or other descriptors or characteristics, such as for example, geography. The present invention provides geographical research tools that can allow third parties to research and thus aggregate and segregate resource consumption and information for a selection of buildings related to resource consumption based on geographical location such as, for example, zip code, industry, patterns of resource usage, average cost of power per square foot, KW, and KWH, and demand for specific classes of resources, such as water, steam, power and gas.

In other overlapping embodiments of the present invention any of the above described embodiments are interfaced with a set of forecasting tools to allow for the forecasting of resource usage, demand, and costs based on various rates including, for example, user supplied rates, market price and variables affecting market price. The forecasting tools can make resource forecasts based partially on user input, such as, for example, a user inputs the square footage for a planned site and the expected use of the site and the forecasting tools of the present invention can forecast the expected resource usage, cost and demand based on the user input.

The resource consumption data for a building aggregated from real time monitoring and metering and through field work on site at the building can be communicated through the use of a graphical user interface of the present invention. The graphical user interface can be divided into frames where each frame is individually selectable. Numerous alternative framing configurations exist only one of which will be described below.

Figure 5:
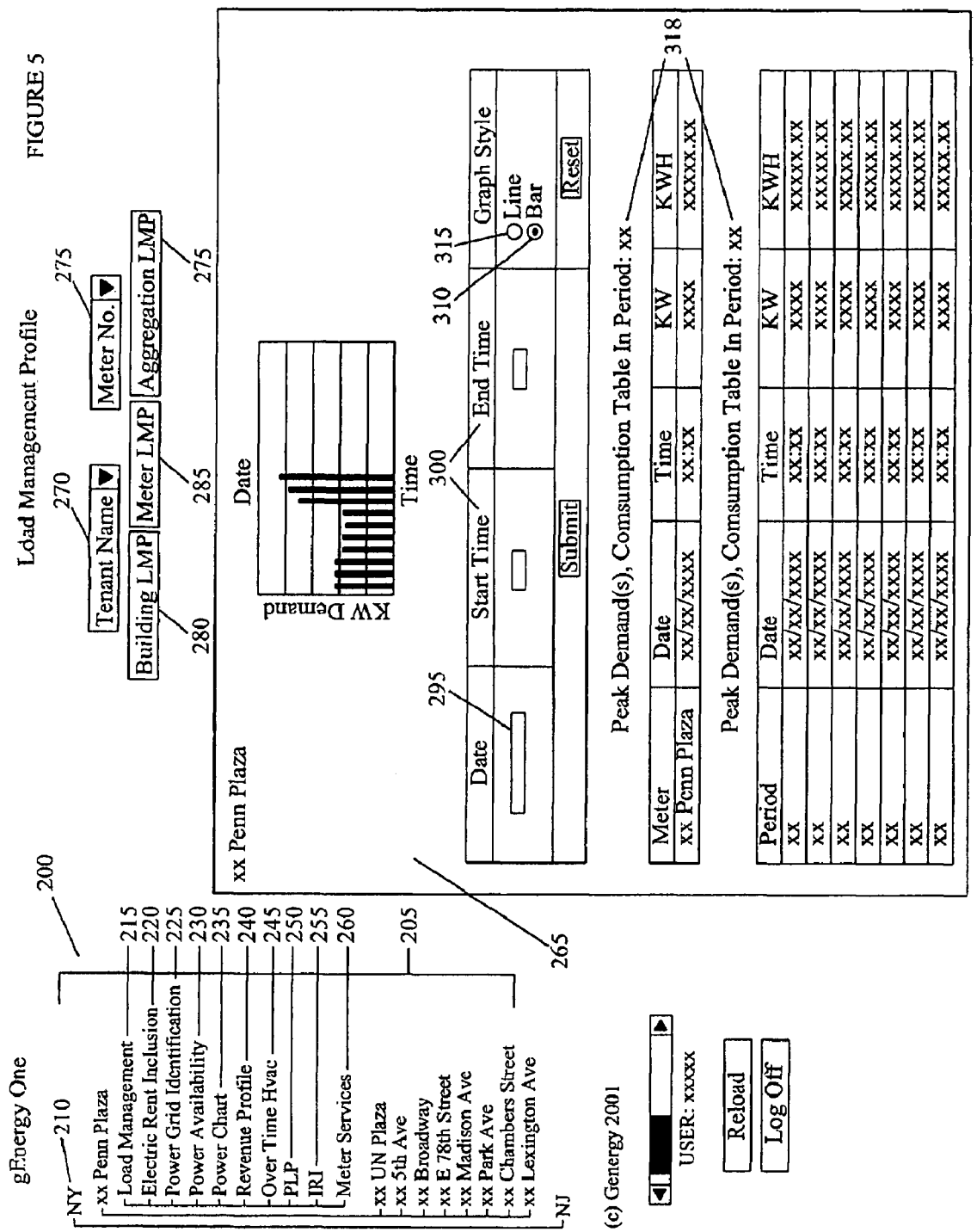
FIG. 5 illustrates one way in which the graphical user interface of the present invention can be configured to display load management profiles.

FIG. 5 illustrates one way in which the graphical user interface of the present invention can be configured. In the leftmost frame, 200, is shown a hierarchical view, 205, of data a user with the proper permissions has access to. The hierarchical view, 205, is a tree structure possessing a plurality of nodes. The nodes allow a user to navigate to a particular object within a particular file by selecting a particular node. For example, FIG. 5 contains a listing in the leftmost frame, 200, in a tree structure, of the data available to the current user. In this instance, the topmost node, 210, of the tree are New York properties held by Acme Realty Trust. Below this node, are individual properties held by the Trust as indicated by street address. Drilling down to the next layer of nodes shows the categories of resource consumption data available for a particular property. Selectable nodes include, for example, Load Management, 215, Electric Rent Inclusion, 220, Power Grid Identification, 225, Power Availability, 230, Power Chart, 235, Revenue Profile, 240, Overtime HVAC, 245, Public Light and Power, 250, Infrared Radiometer Inspection, 255, Meter Services, 260 and Cost Analysis. The right frame, 265, contains the viewable information found under a selected node. The viewable information in the right frame may contain links to objects or other data.

FIG. 5 depicts the Load Management data for a particular tenant, 270, and a particular meter, 275, associated with a tenant at 1 Penn Plaza. The information contained under this node can be depicted as the Load Management Profile for a particular meter, 280, the real time meter reading for the selected meter, 285, or as an aggregate, 290, of all metering devices assigned to a particular tenant. FIG. 5 depicts the Load as shown in kilowatt demand versus a predefined time interval. In FIG. 5 the predefined time interval is one hour. This interval can be as small as instantaneous and as high as, for example, day, week, month or year. The Load Management interface depicted in FIG. 5 permits a user to configure the graph based on date, 295, and time, 300, and as a bar graph, 310, or line graph, 315. The information under the Load Management node also contains historical information showing dates of peak demand, 318, as measured by a particular meter from previous billing cycles.

Figure 6:
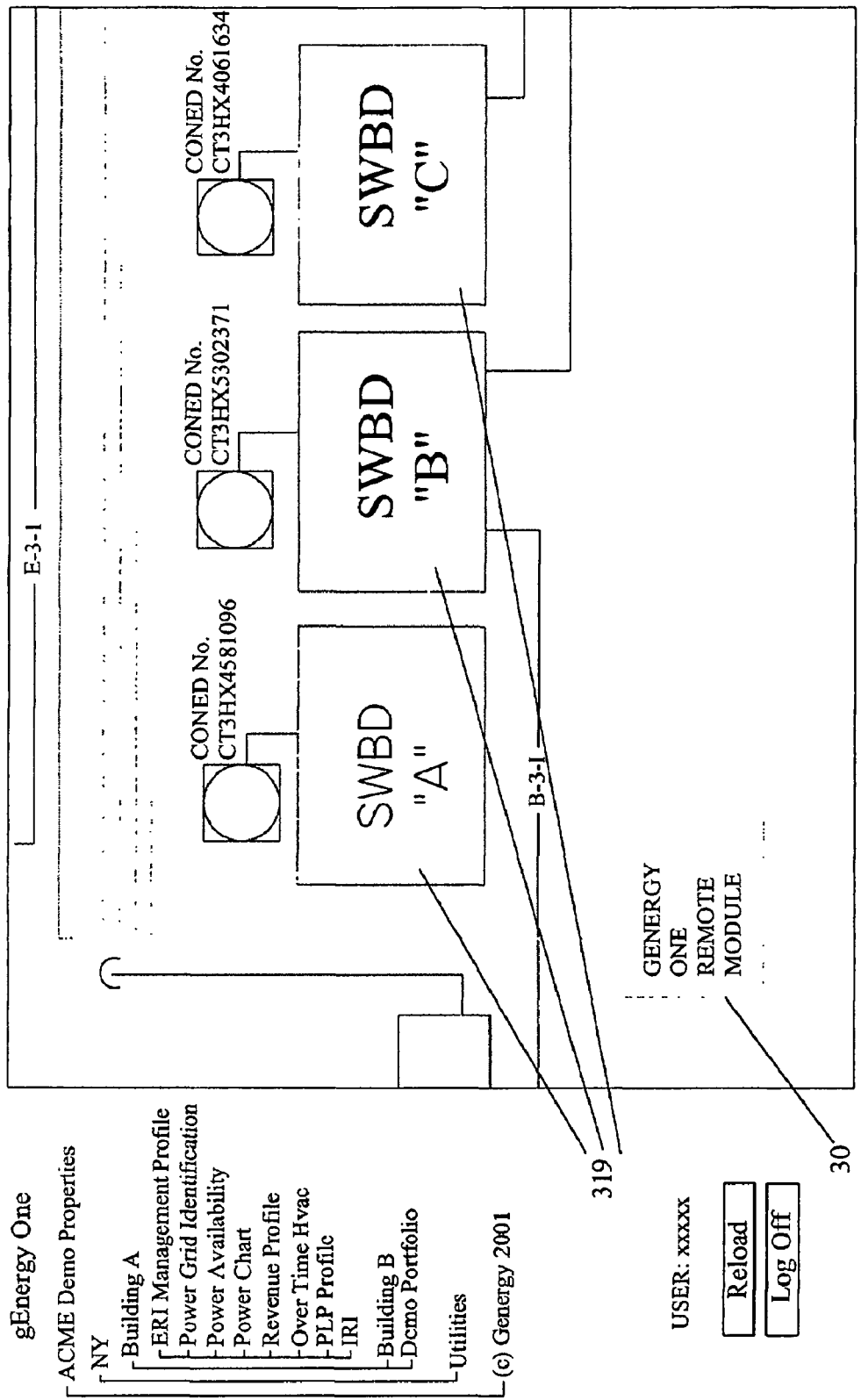
FIG. 6 depicts a blow up of switch objects in a CAD diagram that are linked to real time load profile data.

The load profile data can alternatively be accessed through CAD or CAD-like diagrams. FIG. 6 depicts a selected region of a CAD diagram for the local data collection and processing device 30 (referenced as Genergy One remote module) enlarged to show the details of switchboards 319 A through C. Selecting a particular switchboard, such as SWDB A, will link the user to the load profile data for the selected switchboard.

Figure 7:
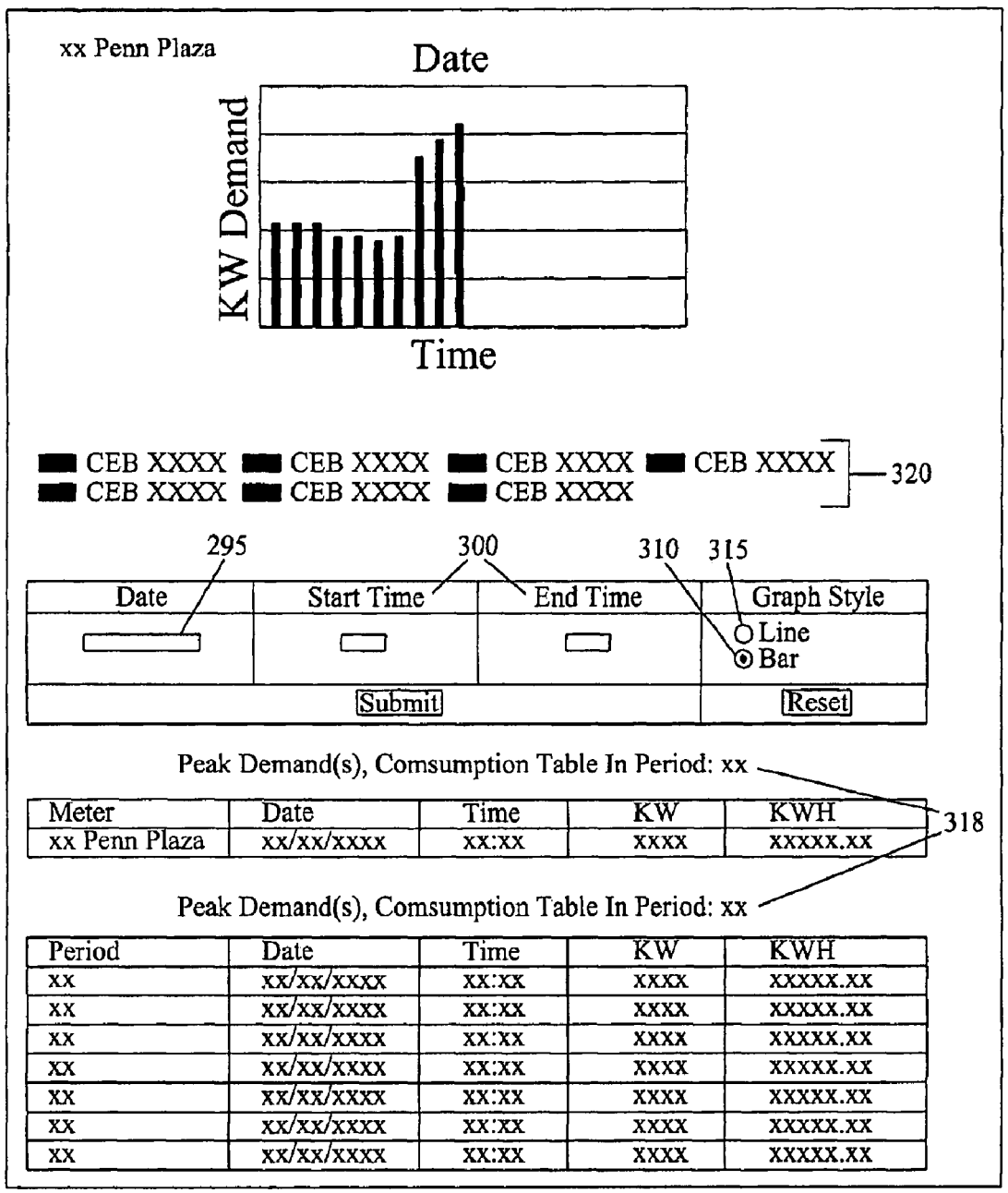
FIG. 7 illustrates one way in which the graphical user interface of the present invention can be configured to display aggregate load profile information for all meters assigned to a selected tenant.

FIG. 7 depicts the Load Management Profile data for all metering devices, and thus the entire Load Management data, for the selected tenant. Each meter's contribution to the total Load Profile is shown in a unique color and identified with a legend, 320. FIG. 7 also depicts the load in kilowatt demand versus a predefined time interval. The predefined time interval is again one hour. This interval can be as small as instantaneous and as high as, for example, day, week, month or year. The information under the Load Management node depicted in FIG. 7 permits a user to configure the graph based on date, 295, and time, 300, and as a bar graph, 310, or line graph, 315. The Load Management node can also contain historical information showing dates for aggregate peak demand, 318, from previous billing cycles.

The system of the present invention can process EM data for a portfolio of buildings or leased properties. For example, FIG. 8 depicts aggregate EM data for several buildings. Each building or lease property entry in FIG. 8 can be linked to detailed information regarding the ERI data for a selected building or lease property. FIG. 9 depicts the type of data that can be found under an Electronic Rent Inclusion link for a particular building within the portfolio, however, a building need not be part of a portfolio for a user to access its associated ERI data. In FIG. 9, selecting the ERI node, 220, divides the right frame, 265, into three frames. The topmost right frame, 400, depicts the aggregate Electronic Rent Inclusion data for the entire building. This frame includes, for example, the total number of Electronic Rent Inclusion tenants, the total Electronic Rent Inclusion square footage, the total monthly and yearly charges under Electronic Rent Inclusion, and the average cost of Electronic Rent Inclusion per square foot. The middle right frame, 410, lists tenants available for Electronic Rent Inclusion. The list includes, for example, a tenant identification number, the tenant name, tenant square footage, the ERI monthly and yearly charge for each tenant, the ERI charge per square foot of tenant space, lease expiration date for each tenant, and tenant move out dates if available. Tenant identification numbers are linked to information that can display in the bottommost right frame, 415. The information in the bottommost right frame contains tenant specific data regarding specific details of ERI charges showing for example in historical timeline the reasons of an increase and/or decrease in charges.

Figure 11:
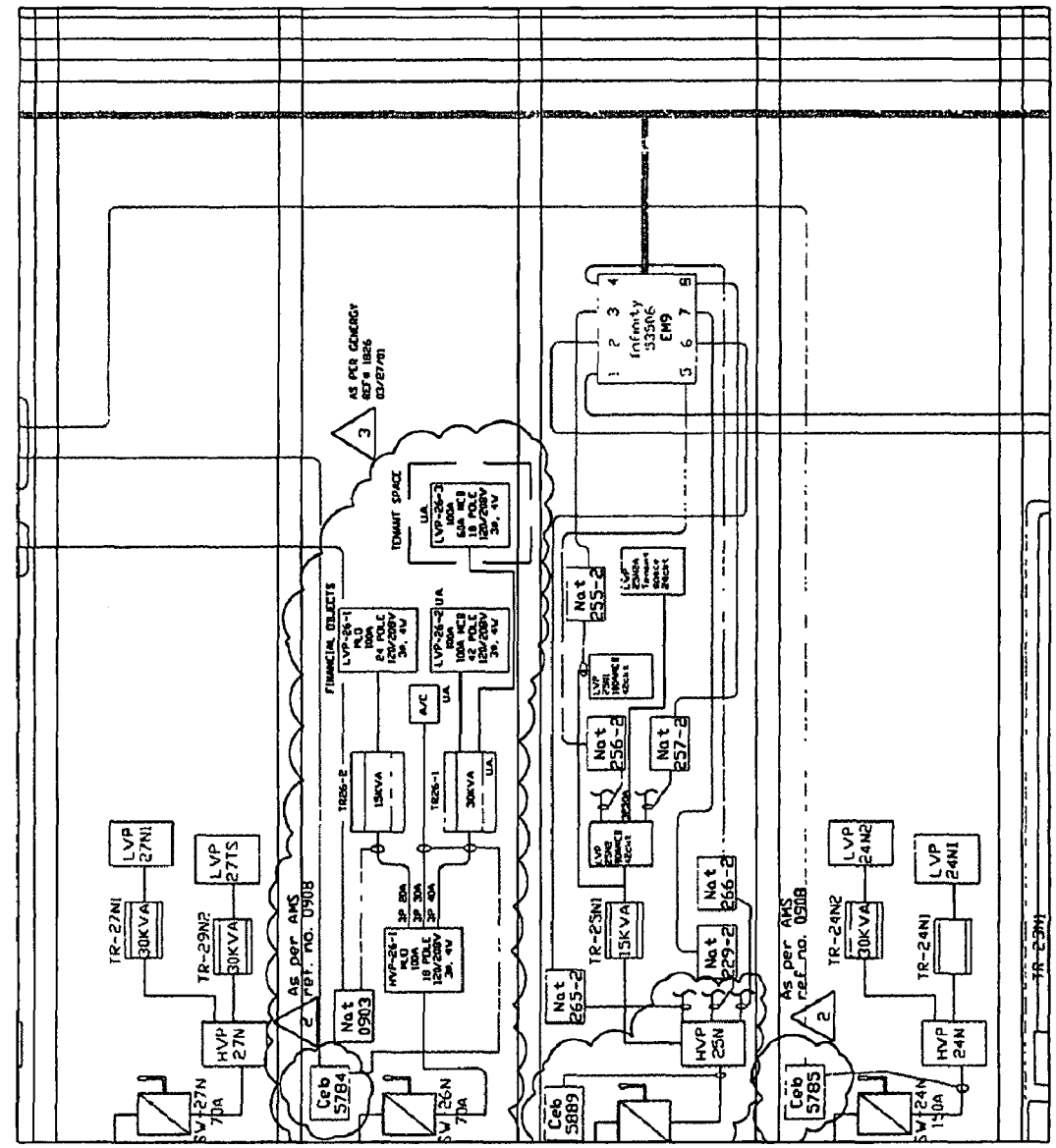
FIG. 11 is a screen shot depicting an enlargement of a selected area from the Power Grid Identification data of FIG. 10.

In FIG. 10, the Power Grid Identification (PGI) node, 225, has been selected. In the right frame, 265, is the PGI for the building at 330 Madison Avenue. The graphical user interface of the present invention can allow the user to zoom in on a particular region of the PGI. Additionally a user can perform other useful functions such as for example, pan, fit to window, save and print. FIGS. 11 and 12 are enlargements of selected areas of the PGI showing for example, high low voltage feeders, distribution panels, lighting and power panels, transformers, pull boxes, devices engineering characteristics (i.e, feeder sizes in American Wire Gauge or Circular Mills, transformer size in KVA, etc.) metering equipment and emergency circuits. FIG. 12 depicts several metering devices as they appear in the PGI diagram. Objects within the PGI may be linked to the operational data for a selected object. Selecting a metering device, such as box labeled NAT 225-2 341, links the user to the details associated with the selected metering device. FIG. 13 depicts the details associated with the selected meter. Depicted in FIG. 13 is the energy usage for the selected metering device broken down by month and profiles certain features; such as for example, previous and current energy usage, on peak and off peak usage, and demand; of the energy usage associated with the selected metering device. The system of the present invention can also monitor and display all the metering devices associated with a single tenant or enterprise. FIG. 14 depicts the energy usage charges for a single tenant for a selected month. Also depicted in FIG. 14 is each metering device assigned to the selected tenant. The inclusion of metering device data allows a tenant or building owner or manager to determine the energy usage costs associated with each meter. Other selected objects on the PGI diagram of FIG. 10 include monitoring devices, such as power quality monitoring devices. FIG. 15 depicts the data, in the right frame, 265, associated with a power monitoring device selected from the PGI diagram of FIG. 10. FIG. 15 includes information on power quality in terms of Volts, Amps, KVAR, Volt Total Harmonic Distortion (VTHD), KW, KVA, Amperes Total Harmonic Distortion (ATHD), Power Factor (PF), and Frequency (Hz).

Figure 17:
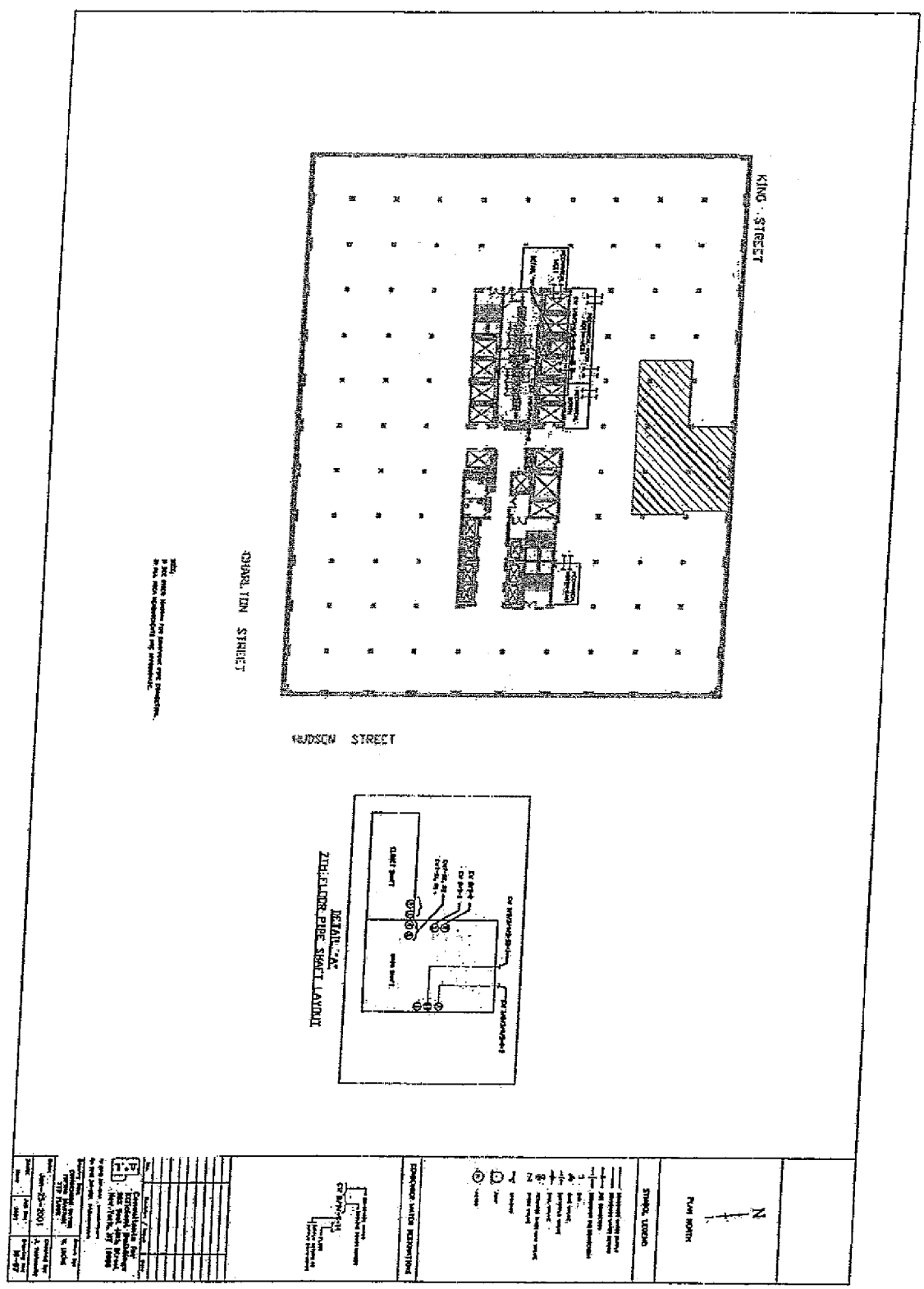
FIG. 17 illustrates one way in which the graphical user interface of the present invention can be configured to display select mechanical systems and equipment for a selected building.
Figure 18:
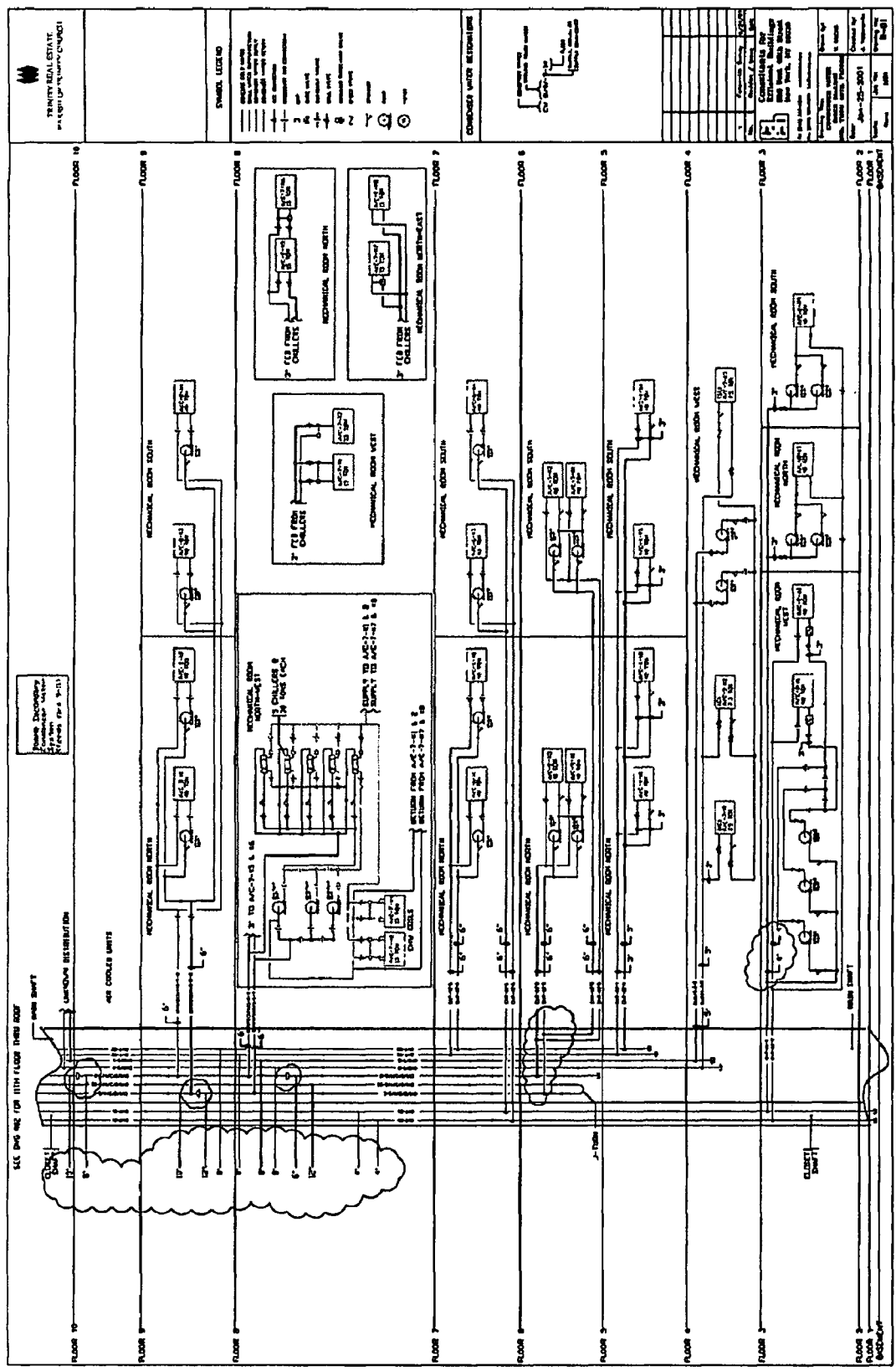
FIG. 18 is a screen shot depicting an enlarged view of a selected region from FIG. 17.
Figure 19:
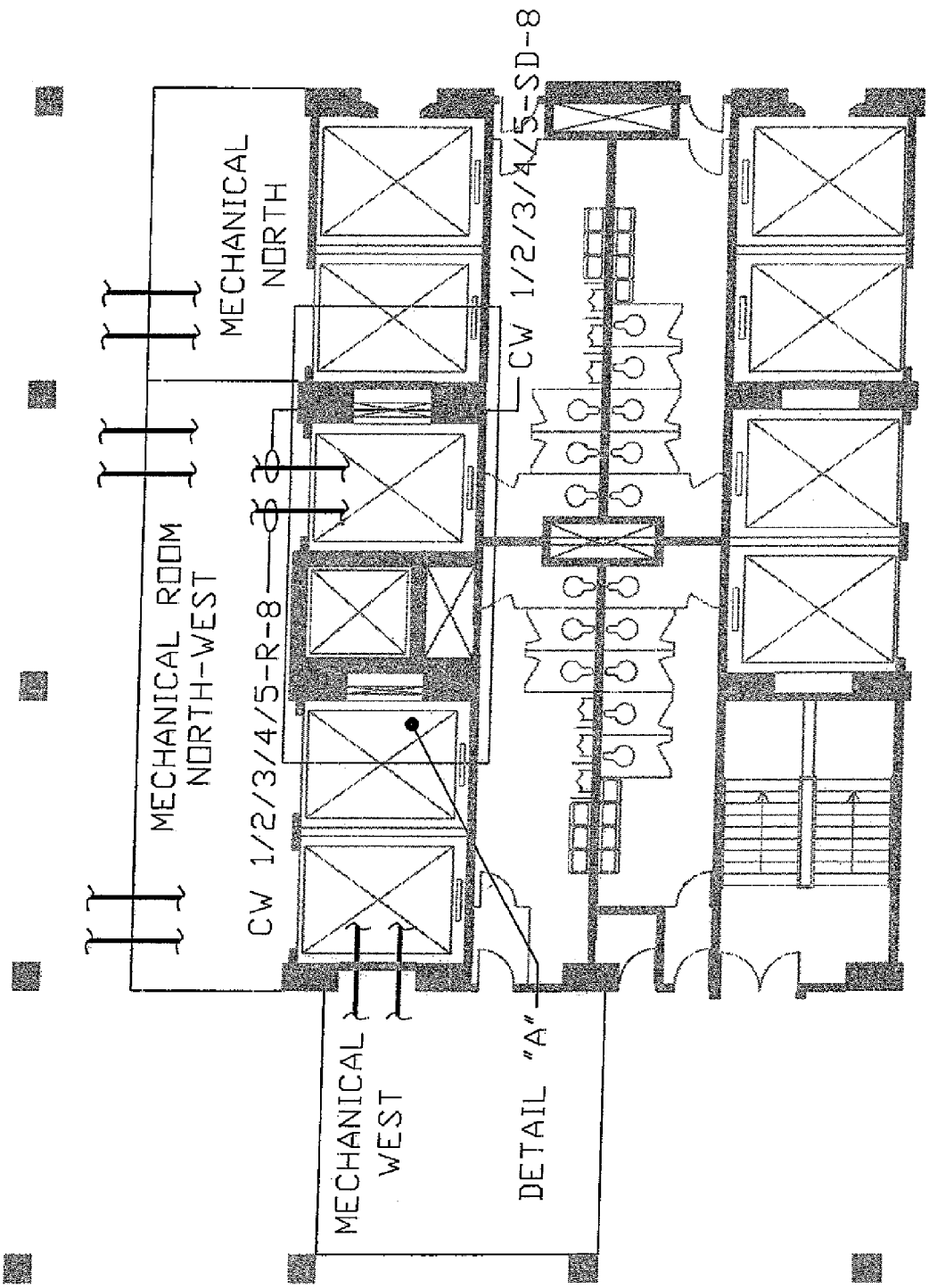
FIG. 19 is a screen shot depicting the location of mechanical rooms and structures hyperlinked to AC number 7 in FIG. 17.
Figure 20:
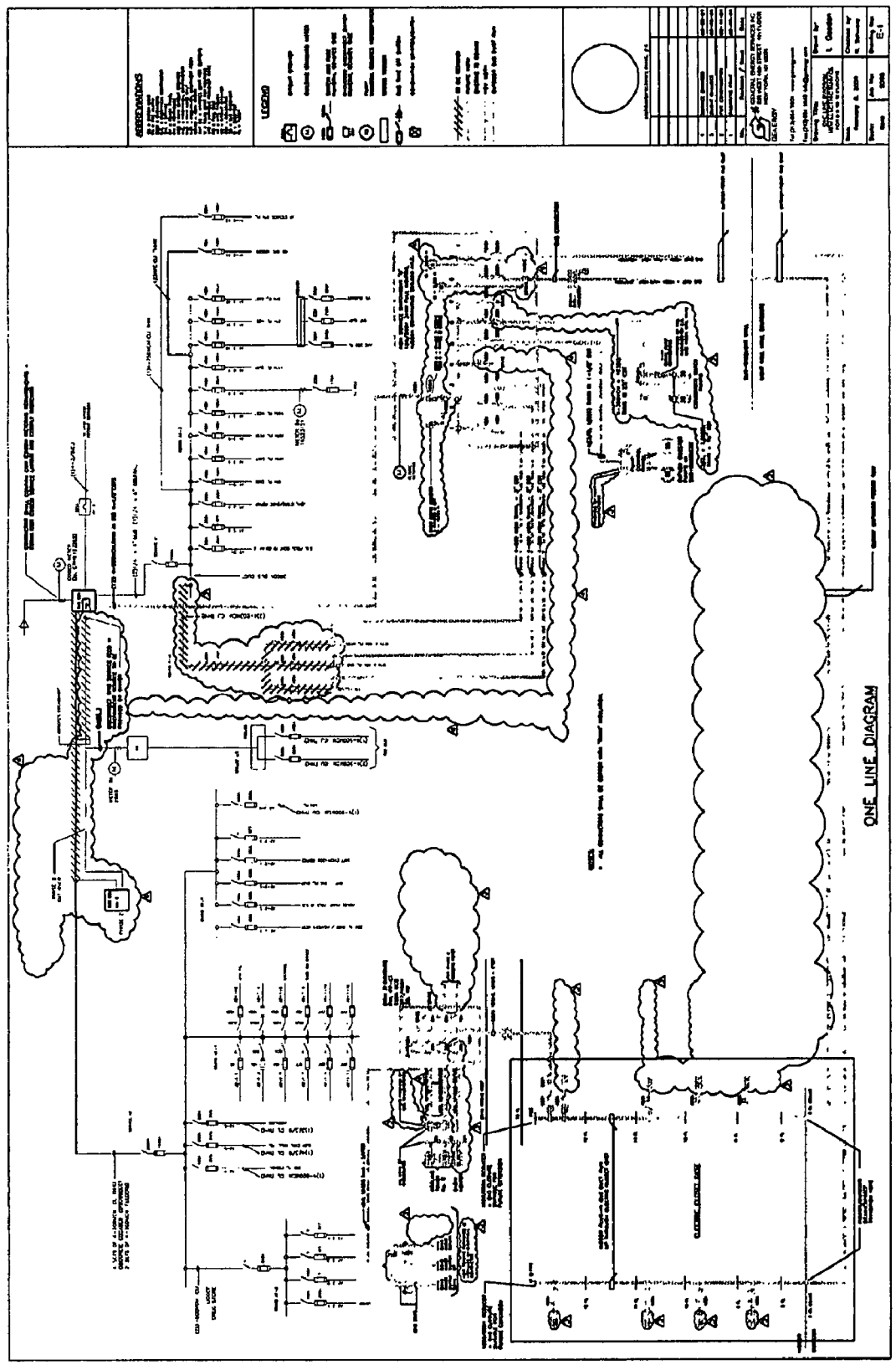
FIG. 20 illustrates one way in which the graphical user interface of the present invention can be configured to display a building's electrical engineering diagram for a Heating, Ventilation, and Air Conditioning (HVAC) system.
Figure 21:
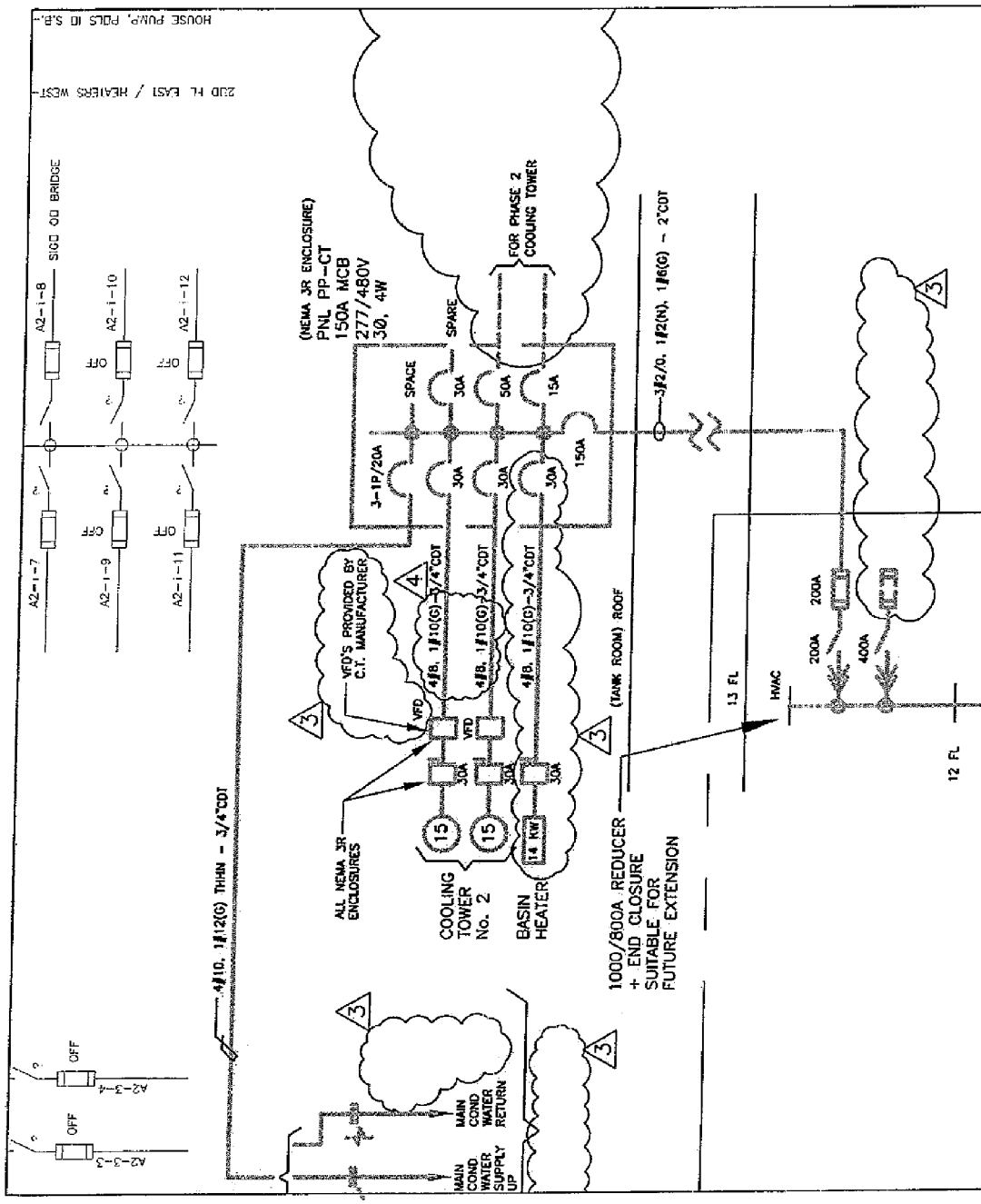
FIG. 21 is a screen shot depicting an enlarged view of a selected region from FIG. 20.
Figure 22:
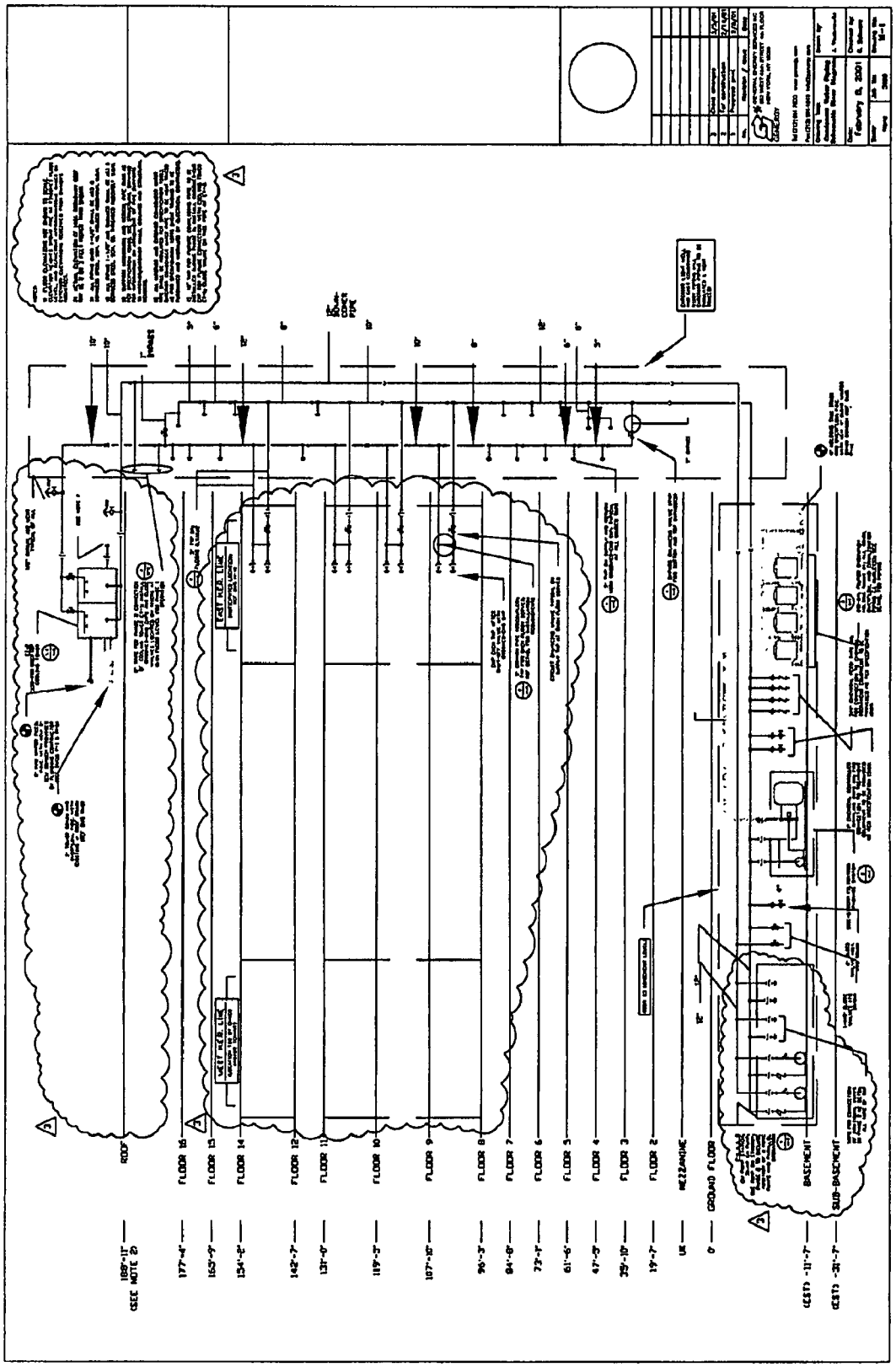
FIG. 22 illustrates one way in which the graphical user interface of the present invention can be configured to display a Heating, Ventilation, Air Conditioning (HVAC) diagram for a selected building.
Figure 23:
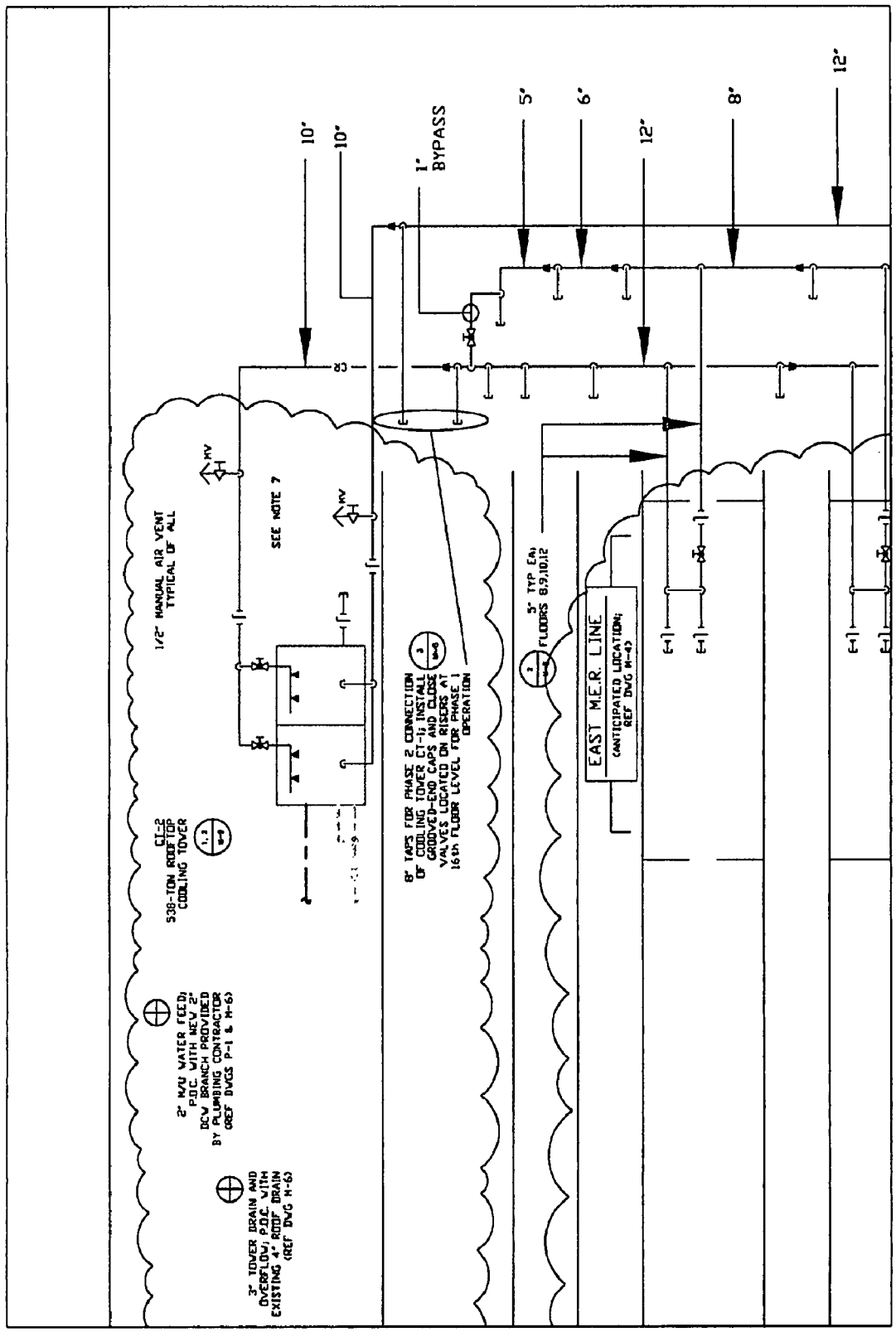
FIG. 23 is a screen shot depicting an enlarge view of a selected region from FIG. 22.

The system of the present invention also provides a graphical user interface to allow access to a building's infrastructure data. Infrastructure data includes, for example, drawings of electrical plans, plumbing plans, and mechanical plans for the building. FIG. 16 depicts a table listing infrastructure data for a particular building. Each listing in the table is linked to a graphic or multiple graphics of a system or subsystem for a building or buildings. FIG. 17 depicts the mechanical systems and equipment rooms by floor for a selected building. FIG. 18 represents a blow up of a selected region in FIG. 17. FIG. 18 depicts the location and layout for mechanical rooms, one of which is associated with air conditioner number 7. FIG. 19 depicts a blow up of a selected region from FIG. 18. FIG. 19 shows the north through west mechanical rooms. FIG. 20 depicts a diagram of an electrical engineering drawing of a Heating, Ventilation, and Air Conditioner system for a select building. Objects depicted in the electrical engineering drawing can be linked to their associated data. FIG. 21 depicts a blow up of a selected region from FIG. 20. FIG. 22 depicts a graphic of a Heating, Ventilation, and Air Conditioner system for a select building. Objects depicted in the HVAC diagram can be linked to their associated data. FIG. 22 depicts a blow up of a selected region from FIG. 23.

Figure 24:
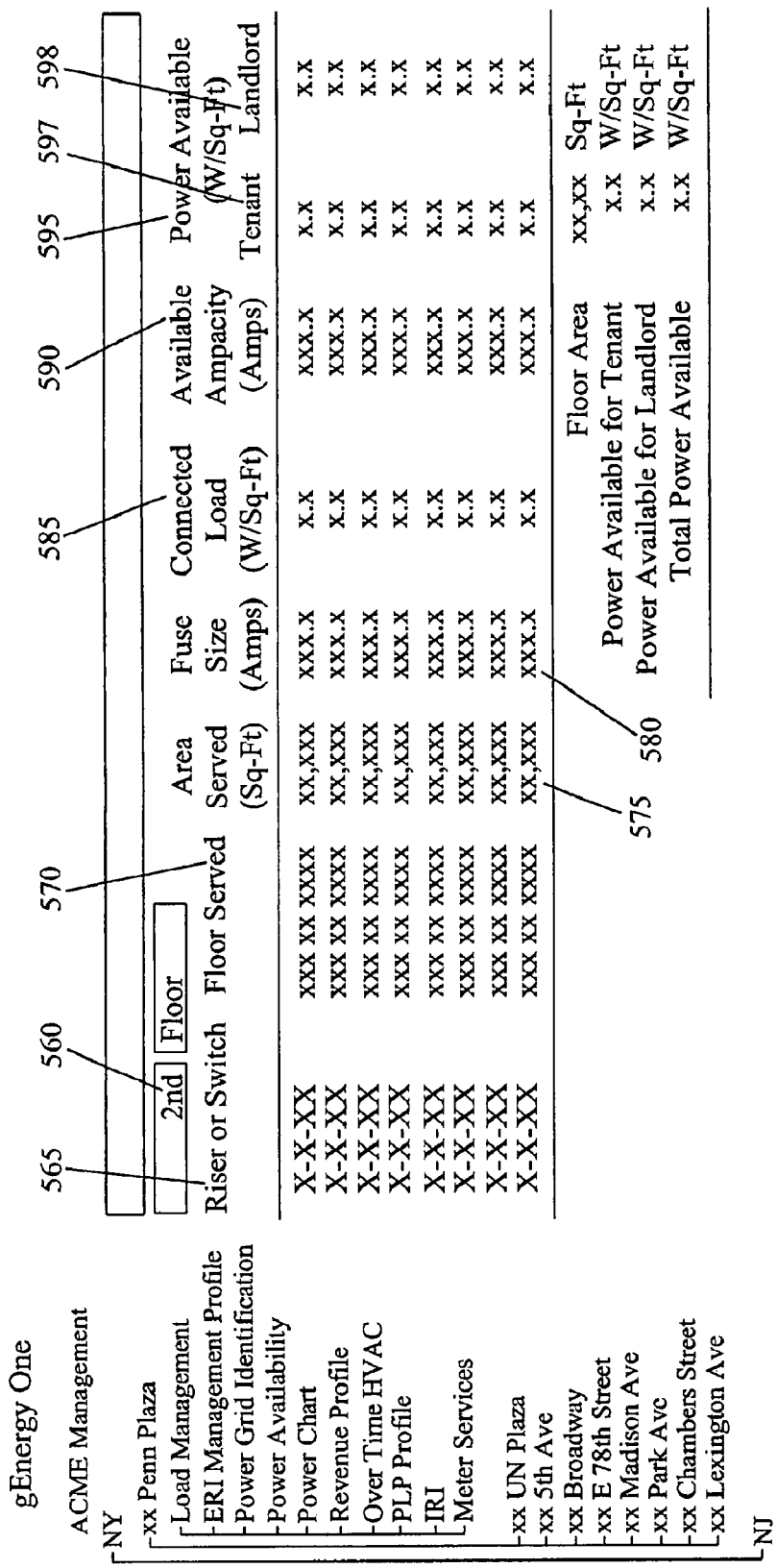
FIG. 24 illustrates one way in which the graphical user interface of the present invention can be configured to display available power for a selected floor within the building.

FIG. 24 depicts the Power Availability of a selected floor within a building. In the case of FIG. 24 the data depicted is for the second floor, 560. The risers or switches, 565, that are available to the second floor are identified along with the other floor or floors, 570, the risers or switches serve within the building. The risers or switches are identified with the total square feet, 575, they serve. The table further identifies the fuse size, 580, for each riser or switch and their connected load, 585. Also identified is the available capacity, 590, in amps, for each riser or switch. The available power, 595, is broken out into the power available to the tenant, 597, and the power available to the building owner, 598, or management service of the building for the indicated floor.

Figure 25:
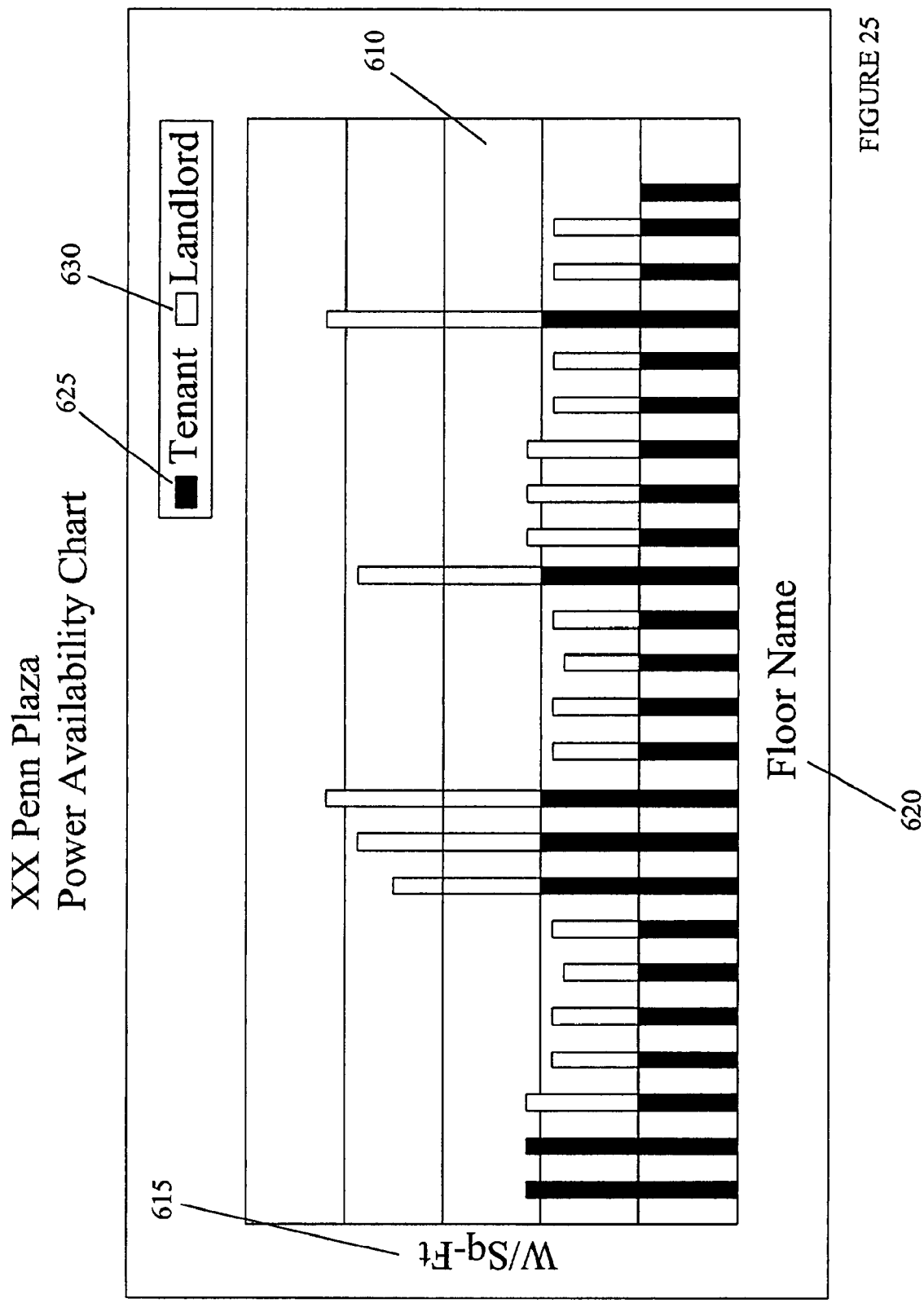
FIG. 25 illustrates one way in which the graphical user interface of the present invention can be configured to display a power availability chart for a building as broken out by floor.

FIG. 25 depicts the Power Chart for a building. The Power Chart depicts, in the form of a bar graph, 610, the watts per square foot, 615, for each floor, 620, of the building. The bars representing the watts per square foot for each floor of the building are broken out into two components, the tenant component, 625, and a landlord/owner/manager component, 630.

Figure 26:
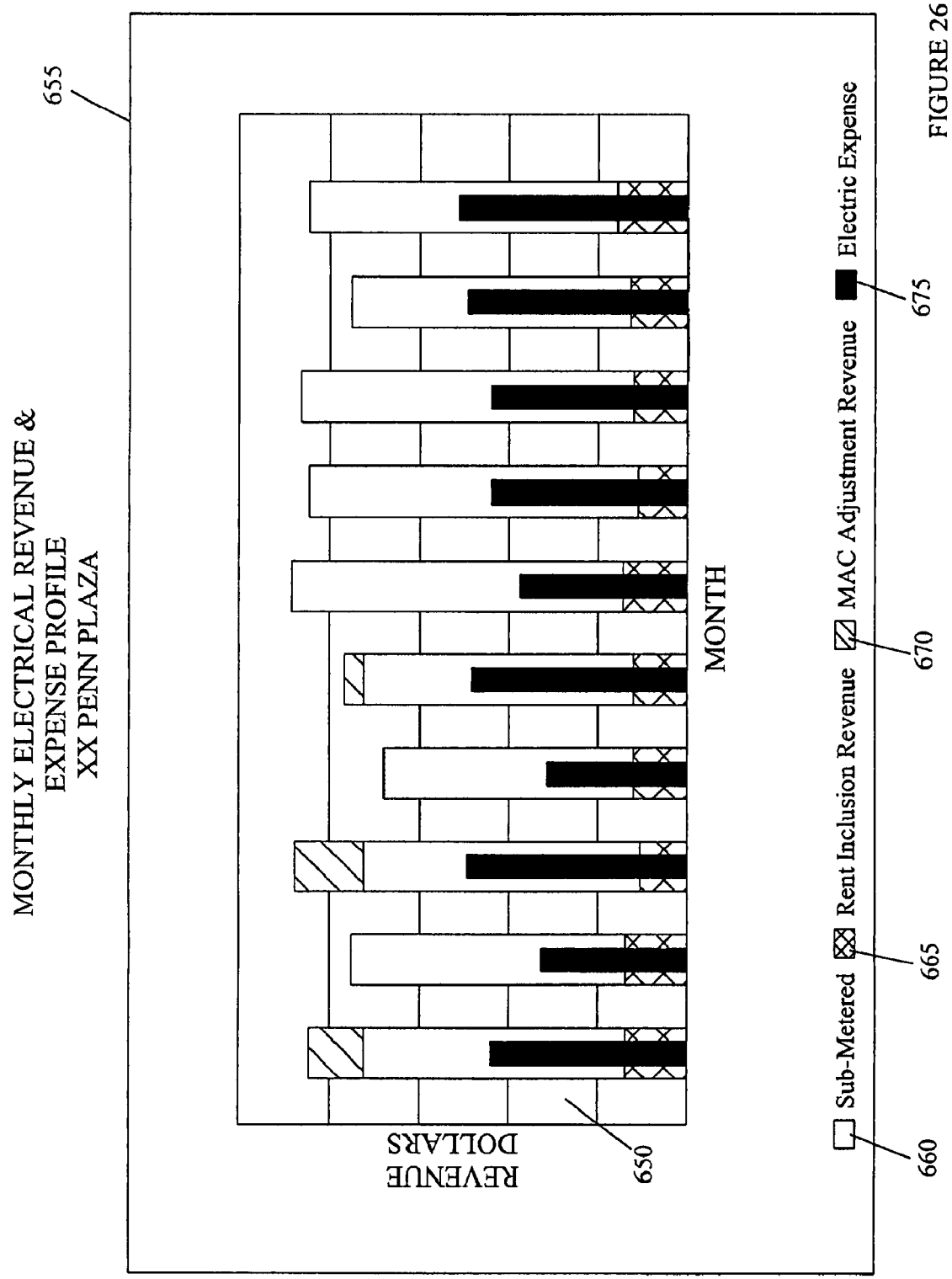
FIG. 26 illustrates one way in which the graphical user interface of the present invention can be configured to display monthly electrical revenue and expense profile for a selected property.

FIG. 26 depicts the Revenue Profile, as based on resource spending by the tenants versus resource income generated through resource metering, rent inclusion charges, monthly and quarterly adjustment charges and fees (MAC), for the building for a predefined period. This figure depicts the monthly electrical revenue and expense profile for a building. Each month is represented by a single bar, 650, in a bar graph, 655. Each bar is broken out into four components that include, for example, sub-metered revenue, 660, rent inclusion revenue, 665, MAC adjusted revenue, 670, and electric expense, 675, for the landlord/owner/manager. Revenue in dollars is represented on the vertical axis and the month is represented on the horizontal axis.

FIG. 27 depicts the Hourly Overtime Cooling rate for any floor of the building requiring overtime cooling services. The rate is broken out into electric costs, 700, in kilowatts per hour, steam costs, 710, in MLBS (Thousands of Pounds), water costs, 715, in CCF (Hundreds of Cubic Feet), repairs and maintenance costs, 720, on a per annum basis, and labor costs, 725. Each overtime service provided is similarly broken out into components to arrive at an hourly rate. A similar analysis applies to heating and other HVAC resources provided by the building outside of its normal hours of operations, where normal hours of operation are defined by the lease terms. Further, depending on the lease terms, the overtime rate for building resource services may vary across floors.

The Public Light and Power node provides resource consumption data for common and/or public areas within the building, such as, for example, lobbies and elevators. The PLP information can be provided in a variety of formats including, for example, by month and in aggregate form such as a year end summary. FIG. 28 depicts the billing information for the common areas of the building for the month of January, 750. Information provided in the billing statement includes, for example, the client name, 755, address, 760, indication of what the bill is for, 765, the present utility rate, 770, energy consumed during both peak and off peak times, 775, demand, 780, (where demand can be measured as the peak Kilowatts of energy used in a 15 minute interval), fuel adjustment, 785, (where fuel adjustment includes charges or credits based on changes in cost of fuel as mandated by the State Public Utility Commission), gross receipt tax, 790, (where gross receipt tax includes tax charges mandated by the State Public Utility Commission), sales tax, 795, and the total charges, 798, for PLP for the identified month. Also provided under this node, 250, is aggregate information, 800, regarding fuel rates for each month, in terms of both on-peak and off-peak, demand, fuel adjustment, and gross receipt tax.

Field studies conducted on a building's resource delivery and utilization structures such as IRI studies are stored in a database and can be reported out to the users through the graphical user interface of the present invention under the IRI node, 255. FIG. 29 depicts the various resource delivery and utilization structures of the building for which IRI studies where conducted. The MI studies reported out in FIG. 29 includes electrical closets on floors nine, 805, and ten, 810, the motor control center on floor twelve, 815, and elevator equipment on the twenty-fifth floor, 820.

Figure 30:
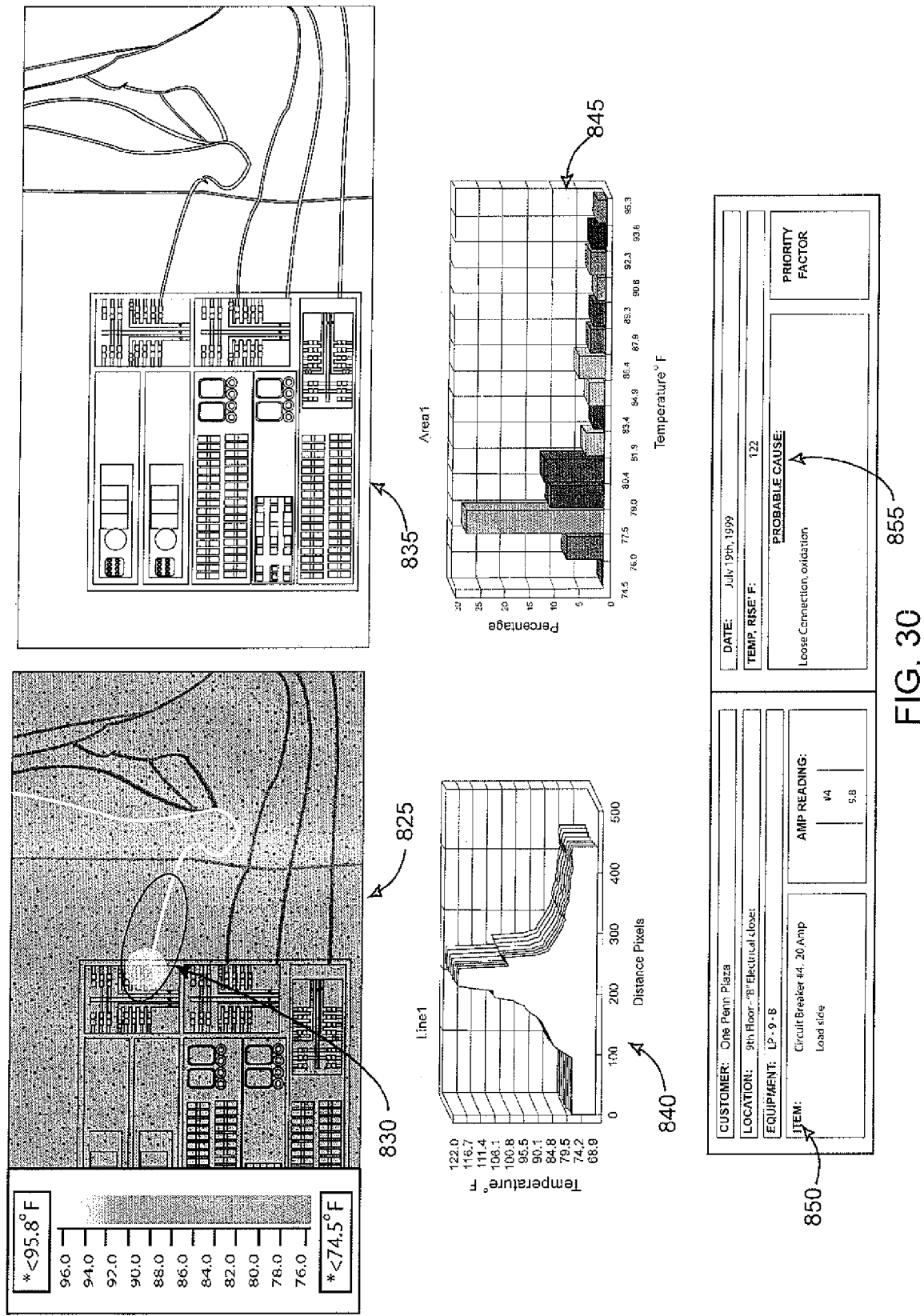
FIG. 30 illustrates one way in which the graphical user interface of the present invention can be configured to display an Infrared Radiometer Inspection study of an electrical closet for a selected property.
Figure 31:
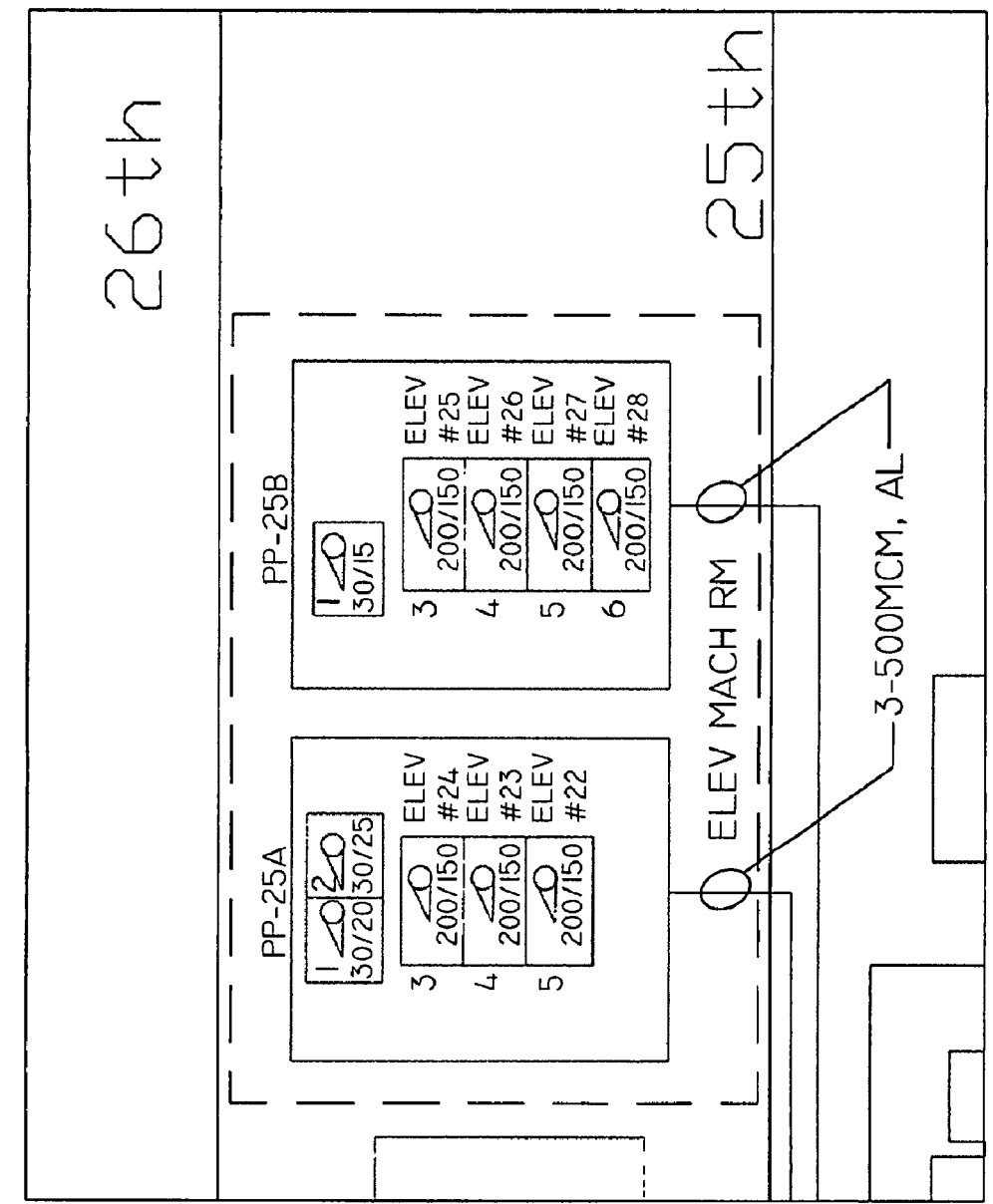
FIG. 31 is a graphic linked to Infrared Radiometer Inspection data associated with select building elevators.

FIG. 30 depicts data displayed by following the link to the electrical closet on the ninth floor, 805. This figure contains an infrared image, 825, of several circuit breakers in the electrical closet. The circled region, 830, indicates an anomalously high temperature associated with a particular breaker. Adjacent to the infrared photograph is a non-infrared photograph, 835, of the identical circuit breaker region from the same electrical closet. The figures immediately below the photographs are temperature plots, 840 and 845, respectively. The temperature plots aid in determining the temperature difference between hot spots and background areas or room temperature. Situated below the temperature plots the equipment (breaker in question) is identified, 850, and a note as to the most probable cause, 855, of the anomalously high temperature is provided. IRI reporting can be done on any resource delivery or utilization structure within the building, including tenant mechanical equipment. The benefits from IRI reporting include, for example, fire prevention and prevention of equipment failure. IRI data can also be linked to a CAD diagram. For example, FIG. 31, which is a blow up of electrical closets associated with several building elevators, can be linked to the IRI studies conducted on the electrical closets.

Figure 32:
FIG. 32 illustrates one way in which the graphical user interface of the present invention can be configured to display a utility bill for a selected building tenant.

FIG. 32 depicts the type of information that can be found under the Metering Services node, 260. This is effectively the resource usage bill that is sent to a building tenant. The information used to generate the billing can be obtained from either manual meter reading or through the collection of meter readings from the meter itself as sent to the database via a network connection between either the meter itself or a central data collection and processing device local to the building. The billing data includes, for example, an indication of the billing period, 900, a break out of the resource usage as measured by each meter, 910, assigned to the tenant, administration and service fees, 915, sales tax, 920, and the total billing amount, 925. Each meter is broken out into both on-peak and off-peak consumption, 930, total kilowatts per hour, 935, and demand kilowatt, 940, where demand kilowatt can be defined as peak kilowatts of energy used in a 15 minute interval.

Figure 33:
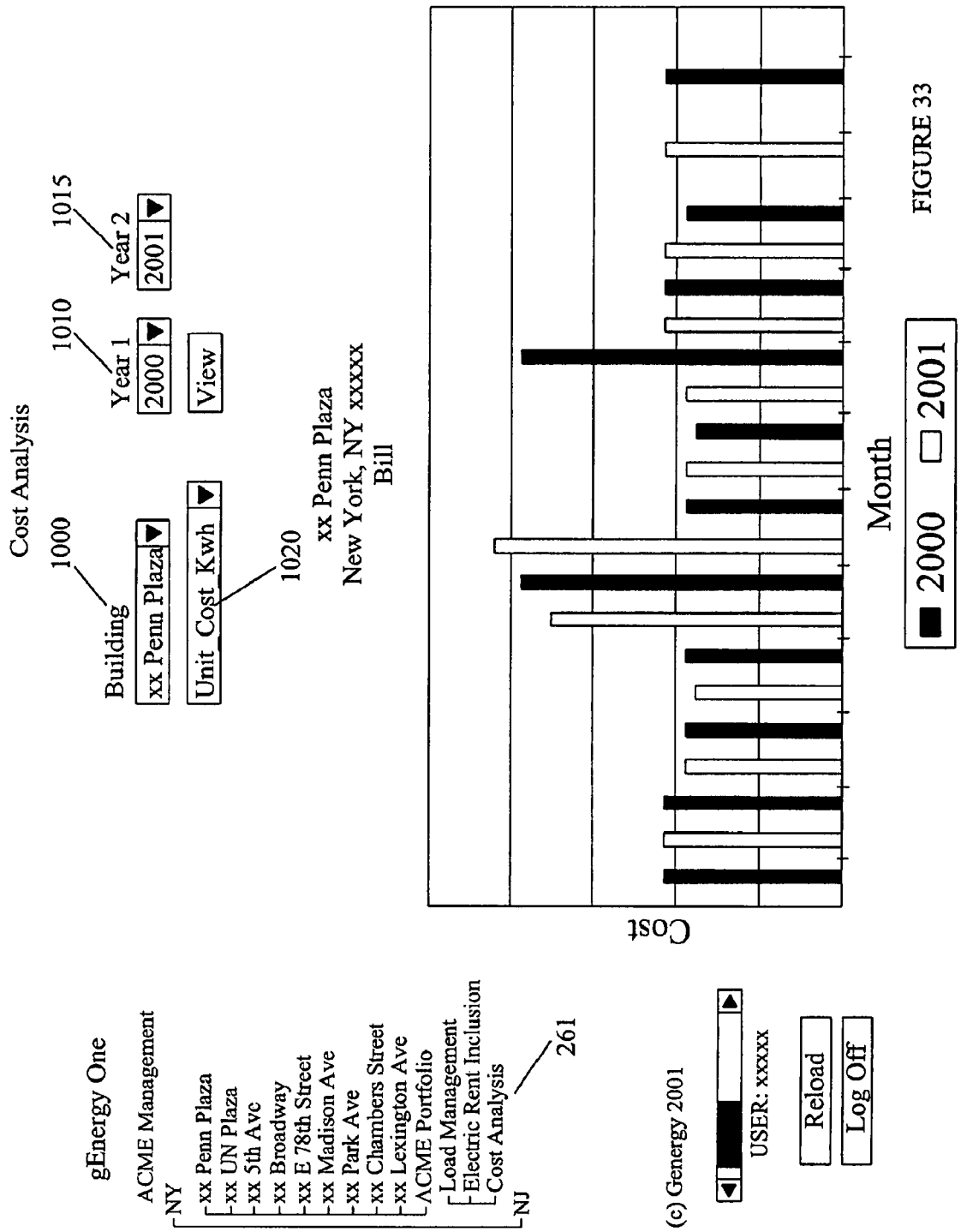
FIG. 33 illustrates one way in which the graphical user interface of the present invention can be configured to display cost analysis of a selected property wherein the analysis is in terms of unit kilowatt hours.
Figure 34:
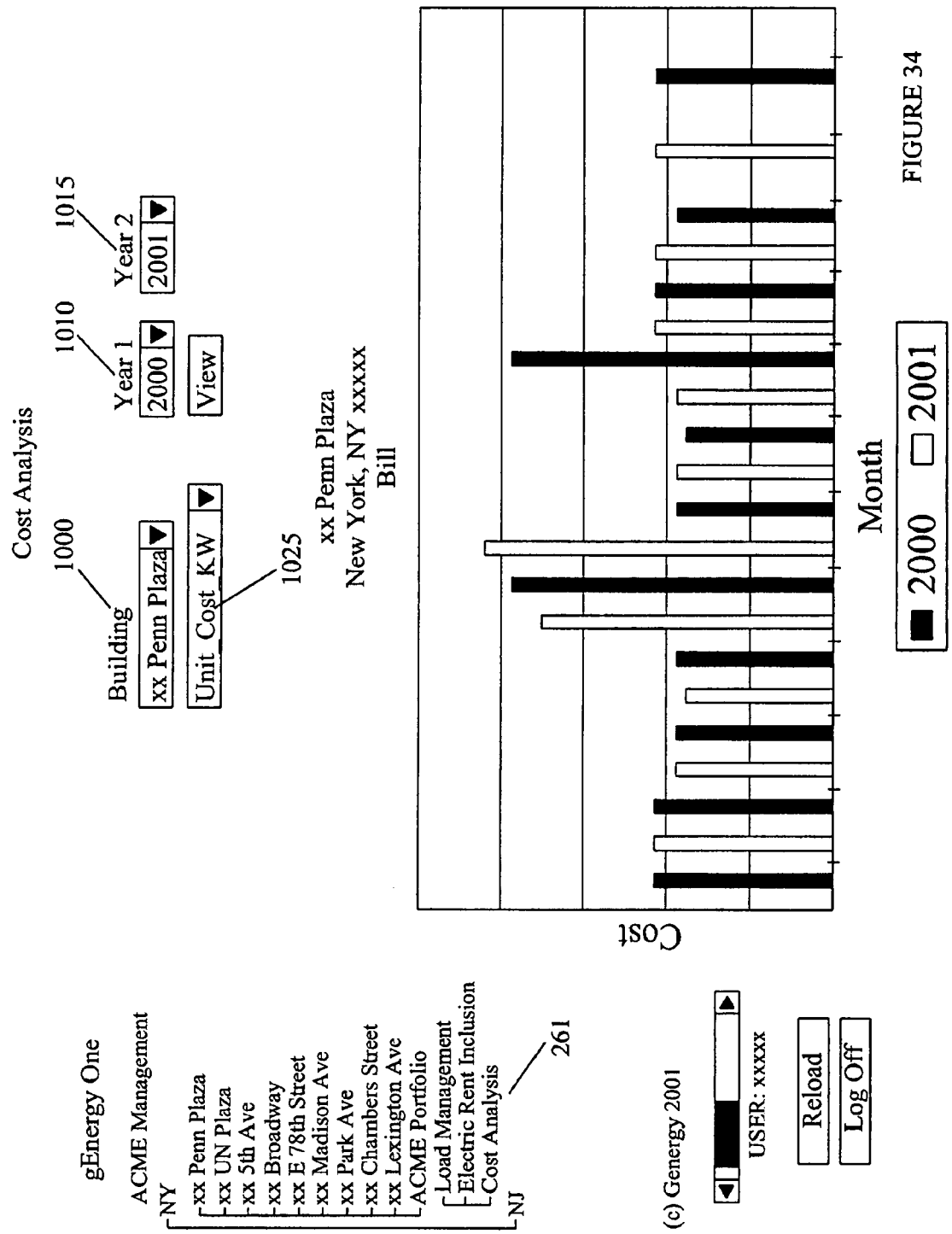
FIG. 34 illustrates one way in which the graphical user interface of the present invention can be configured to display cost analysis of a selected property wherein the analysis is in terms of unit kilowatt costs.
Figure 35:
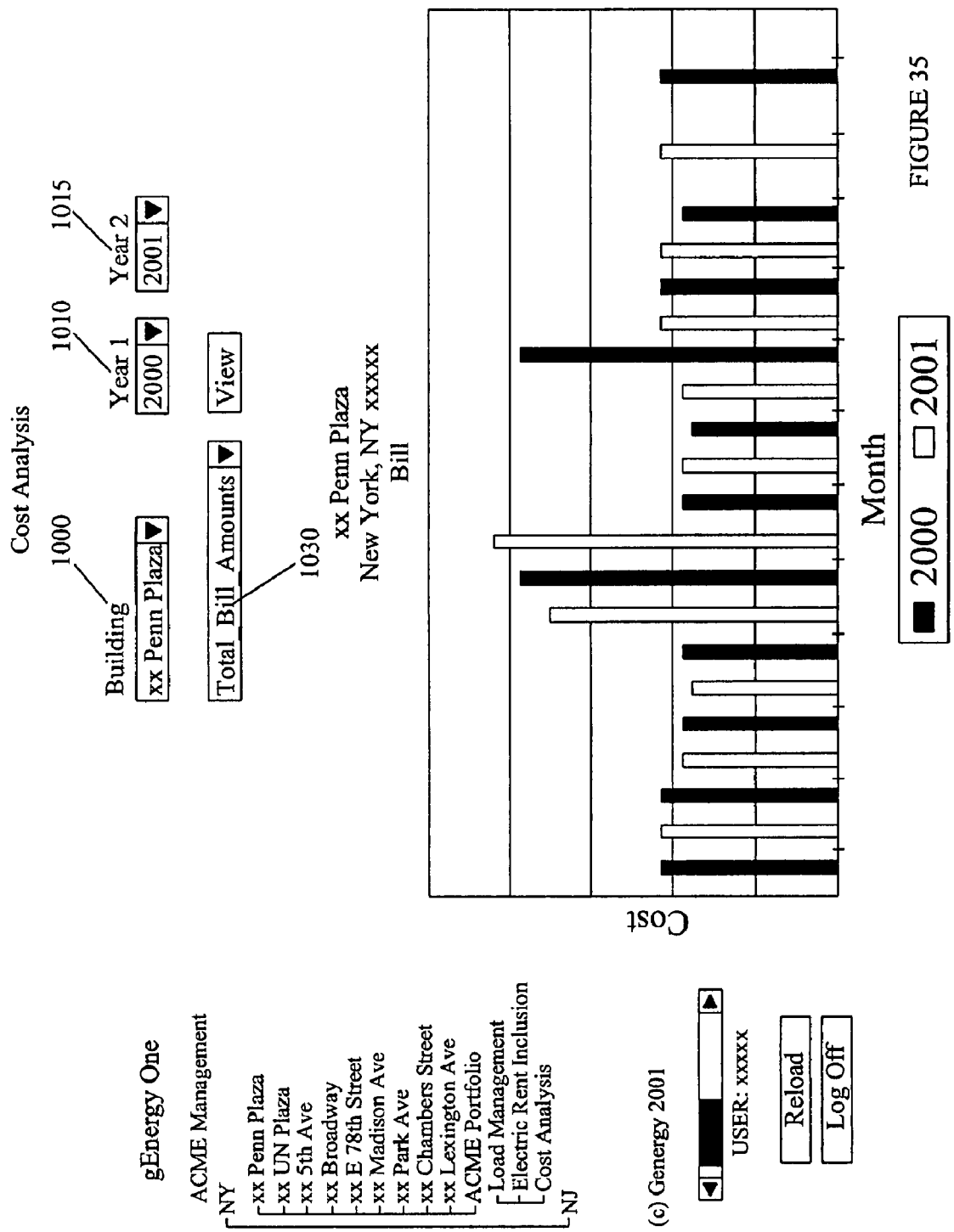
FIG. 35 illustrates one way in which the graphical user interface of the present invention can be configured to display cost analysis of a selected property wherein the analysis is in terms of the total bill amounts.

The graphical user interface of the present invention also provides a node, 261, for resource consumption cost analysis. The cost analysis reports for the building are configurable by the user. In FIGS. 33, 34 and 35 the resource consumption cost reports can be configured by property, 1000, years, 1010 and 1015, and unit cost per kilowatt hour, 1020, FIG. 33, unit cost per kilowatt, 1025, FIG. 34, and total resource billing amount per month and year, 1030, FIG. 35. The resource consumption cost analysis compares the costs associated with resource consumption between a period of time, for example, two years, wherein the costs are broken out by month or other predefined time interval such as day, week, or year.

The system of the present invention is not limited to multistory buildings or vertical power riser structures nor is it limited to single structures. The system of the present invention can profile and manage the resource consumption of several buildings through a single interface. FIG. 36 is graphic depicting aggregate, broken out by individual building, load profile data for several geographically distinct properties. FIG. 36 depicts the total load profile for eight buildings. Any of the aforementioned functionality of the present invention can be combined, for each selected building, into a resource management portfolio and singularly managed and monitored through the portfolio. An example of an application of the present invention to a horizontal riser system is a franchise of gas stations. Instead of a single PGI diagram the present invention can provide a geographic map with the location of each gas station in the franchise indicted on the map. Selecting a particular gas station would present the user with CAD diagrams for electrical, mechanical and plumbing systems, or links to same, associated with the selected gas station. The monitoring and metering devices local to the stations would communicate with a data collection and processing device local to each station, wherein the data collection and processing device local to the station would communicate with a centralized remote data collection and processing device. In alternative overlapping embodiments, the monitoring and metering devices could communicate directly with the centralized, remote data collection and processing device. Each gas station in the franchise could be placed in a resource management portfolio and allow a franchise manager or other user of the system to monitor and manage aggregate resource consumption data such as load profile data for all stations.

The system of the present invention is also applicable to resource monitoring and management for tenants dispersed across several buildings. For example, a landlord or management company managing 1,500 apartments across 300 buildings can employ the system of the present invention to monitor and manage resource consumption for each tenant.

Figure 37:
FIG. 37 is a screen shot depicting an example of security protocols that control access to resource consumption data.

Access to the graphical user interface is controlled by security protocols. One type of security protocol employed by the system is the use of passwords, 1100, as shown in FIG. 37. The system employs a password hierarchy, wherein different users have different types of access to information contained on the system and control that can be exhibited over the system as determined by their level of password.

Figure 38:
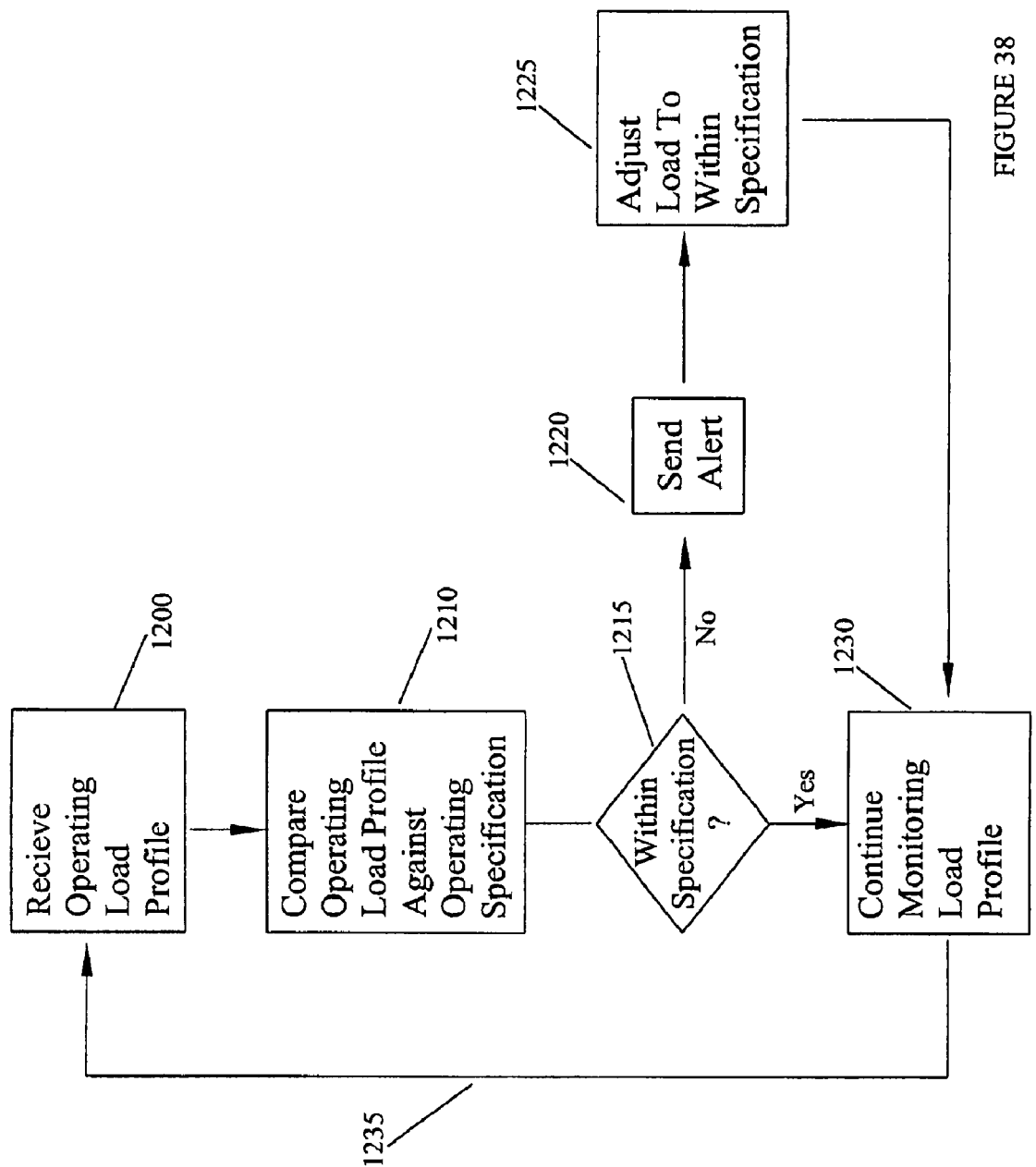
FIG. 38 illustrates a flow diagram on how load profiles can be determined through the many available feedback methods of the present invention.

The present invention provides a variety of feedback methods to control resource consumption for the building, wherein these methods take advantage of the system of the present invention connectivity and control of the building's resource delivery and utilization structures and the aggregate resource consumption data stored in a database. FIG. 38 provides a diagram of one feedback method used in the present invention. In this method, a data collection and processing device receives, at 1200, information about a particular operating load profile. This load profile is checked, at 1210, against the operating specifications for the selected device stored in a database. If the load profile is outside, at 1215, of the operating specifications the data collection and processing device sends an alert message, at 1220, either to another data collection and processing device, the building's resource management system or a live person. In addition to the alert sent either the data collection and processing device monitoring the load profile or other processing device adjusts or switches, at 1225, the load so as to be within the operating specifications. The data collection and processing device continues monitoring, at 1230, the load profile. If the monitored load profile is within operating specifications no action is taken to adjust the load and the data collection and processing device continues monitoring, at 1230. The load monitor perpetuates, wherein the data collection and processing device loops around, at 1235, and obtains the most current load profile reading and starts the process anew.

Figure 39:
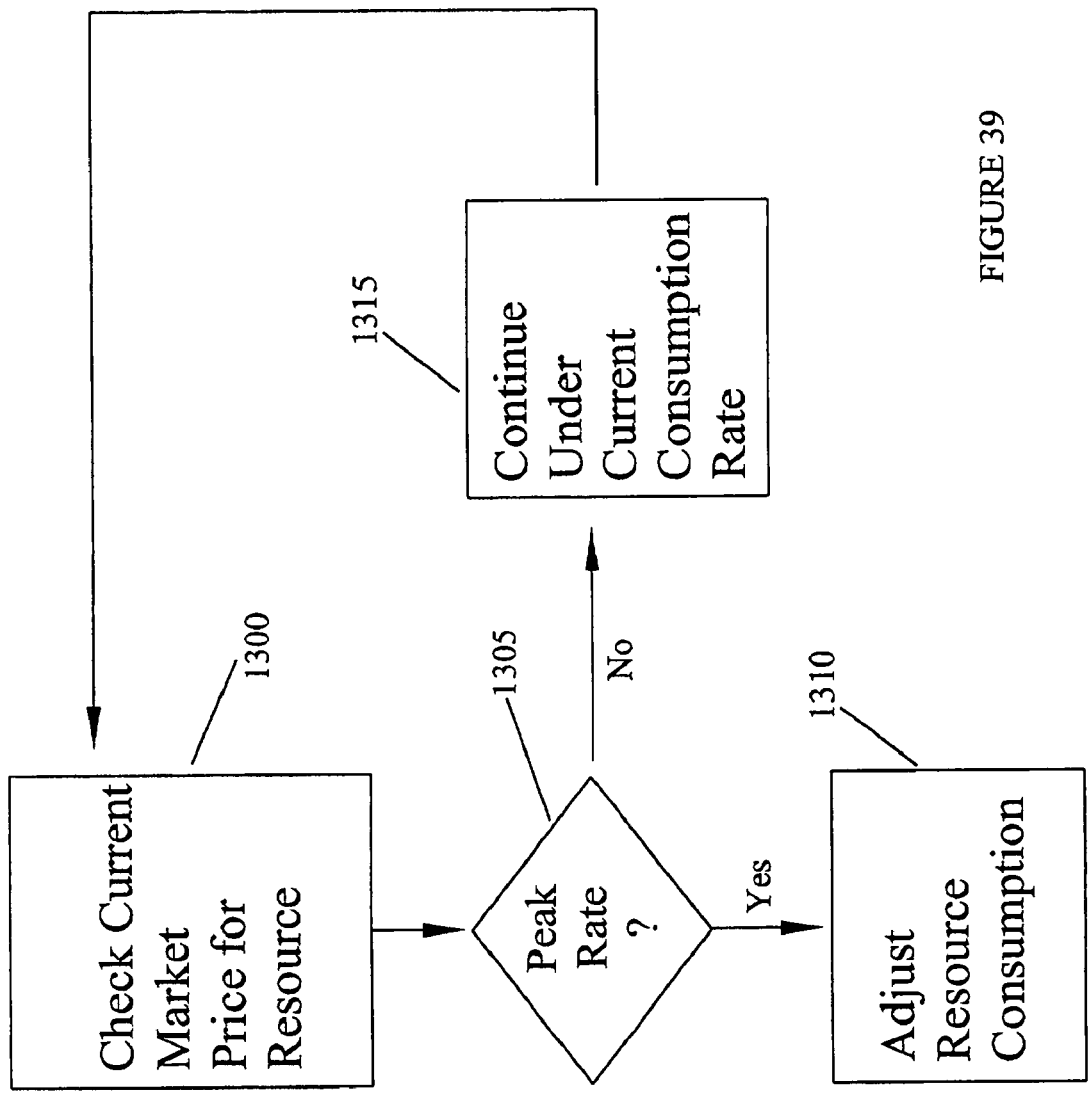
FIG. 39 illustrates a flow diagram on how building resource consumption can be determined through the use of external information such as resource market price.

Another example of a feedback method that can be employed in the present invention is shown in FIG. 39. In this method the operation of the building is continually checked, at 1300, against the current resource market price. In a deregulated power market, it is anticipated that consumers will be charged different rates for resource consumption based on when they use the resources. The method depicted in FIG. 39 controls the rate at which the building consumes resources based on the current market price of the resource. The system first obtains the current market price, at 1300, for the resource from available resource service providers or other resource resellers and providers. If the current rate, at 1305, indicates a peak rate the method adjusts the resource consumption rate, at 1310, of the building to keep building resource costs down. For instance, if peak rates are returned the method may adjust the thermostat by raising or lower it by one to a couple of degrees. If a peak rate is not returned the building will maintain, at 1315, its current rate of resource consumption provided other sources of input do not indicate otherwise.

In general, it should be emphasized that the various components of embodiments of the present invention can be implemented in hardware, software, or a combination thereof. In such embodiments, the various components and steps would be implemented in hardware and/or software to perform the functions of the present invention. Any presently available or future developed computer software language and/or hardware components can be employed in such embodiments of the present invention. For example, at least some of the functionality mentioned above could be implemented using C, C++, JAVA, Perl, or ASP scripting programming languages or combinations thereof.

Although the invention has been described and illustrated in the foregoing exemplary embodiments, it is understood that the present disclosure has been made only by way of example, and that numerous changes in the details of construction and combination and arrangement of processes and equipment may be made without departing from the spirit and scope of the invention.

What is claimed is:

1. A system for monitoring, gathering, processing, integrating and reporting real time resource consumption, resource delivery and equipment states for at least one building comprising:

a plurality of monitoring devices associated with said building resource delivery and utilization structures;

a plurality of metering devices associated with said building resource delivery and utilization structures;

a first data collection and processing device at said building connected to and gathering data from each monitoring device and metering device associated with said building;

a second data collection and processing device remote to said building for coordinating universal time among all metering devices and gathering data from said first data collection and processing device;

a third data collection and processing device remote to said building for converting field surveys of said building, infrastructure data of said building, and resource consumption of said building into at least one database;

a fourth data collection and processing device remote to said building for manipulating resource data gathered from said second data collection and processing device and converting said data into resource billing data;

a fifth data collection and processing device connected to said first, second, third, and fourth data collection and processing devices remote to said building for coordinating and integrating all data processed by said first, second, third, and fourth data collection and processing devices into a relational database available in real time, wherein the first data collection and processing device monitors electrical loads for said building resource delivery and utilization structures and equipment in real time;

said system monitoring alternative resource services available for said one building in addition to conventional remotely supplied power; and said system integrating delivery of said alternative resource services with said conventional remotely supplied power.

2. The system according to claim 1 wherein at least one data collection and processing device sends an alert message when at least one of electrical loads and environmental conditions are outside operating specifications.

3. The system according to claim 2 wherein the alert message is sent by said fourth data collection and processing device.

4. The system according to claim 1 wherein the first data collection and processing device receives input from at least one of said second, third, fourth, or fifth data collection and processing device remote to said building.

5. The system according to claim 4 wherein said input is received through a network connection.

6. The system according to claim 5 wherein said network connection is at least one of a LAN or WAN.

7. The system according to claim 1 wherein said plurality of monitoring devices monitor resource consumption and resource delivery in real time.

8. The system according to claim 1 wherein said plurality of metering devices meter resource consumption and resource delivery in real time.

9. The system according to claim 1 further comprising a plurality of monitoring devices associated with the exterior and interior of said building, wherein said plurality of exterior and interior monitoring devices receive input on weather conditions local to said building.

10. The system according to claim 1 wherein said database from said third data collection and processing device is database comprising CAD and ODBC databases.

11. The system according to claim 1 wherein the relational database produced by the fifth data collection and processing device comprises infrastructure data for said building, resource consumption data for said building, resource billing data, resource revenue data for said building, resource expenses for said building, and critical load data.

12. The system according to claim 11 further comprising historical resource consumption data, real time resource data, historic local atmospheric data, resource load profiling data, tenant specific data, tenant lease terms, field studies, field surveys, and riser usage.

13. The system according to claim 1 wherein said plurality of monitoring devices receive input from at least one remote data collection and processing device, wherein said input determines at least one of the resource consumption or resource delivery for said building.

14. The system according to claim 13 wherein the determination of at least one of resource consumption or resource delivery for said building is localized to a defined region or resource utilization structure within said building.

15. The system according to claim 1 wherein the data gathered from said plurality of monitoring devices determines at least one of resource consumption or resource delivery for said building.

16. The system according to claim 1 wherein the resource consumption and resource delivery for said building is determined by resource market price.

17. The system according to claim 1 further comprising a resource trading platform, wherein said resource trading platform allows the trading of resources for said building with other buildings or resource service providers.

18. The system according to claim 17 further comprising geographical research tools, wherein said geographical research tools includes tools for at least one of obtaining resource consumption data on resource usage patterns, average cost of resource per unit volume, and demand for a specific resource based on a selection of buildings in a geographic region.

19. The system according to claim 1 further comprising resource consumption forecasting tools, wherein said forecasting tools includes tools for at least one of forecasting resource usage, forecasting resource demand and forecasting resource costs.

20. The system according to claim 1 wherein the monitoring devices include devices that monitor the security of at least one building.

21. The system according to claim 1 further comprising a building resource management system, wherein said building resource management system is in communication with a at least one data collection and processing device.

22. The system according to claim 1 wherein the resource consumption data gathered is used to optimize the utilization of resource driven devices in relation to resource costs and weather conditions local to said building.

23. The system according to claim 1 wherein resource consumption, resource delivery and mechanical equipment data for said building are accessed by a remote computer using an Internet web browser.

24. The system according to claim 1 wherein communication between said data collecting and processing devices is via TCP/IP.

25. The system according to claim 1 further comprising the use of a variety of communication protocols including MODBUS, RS232, RS485, PLC or RF technology, and TCP/IP.

26. The system according to claim 1 wherein the monitoring devices and metering devices are linked to the first data collection and processing device via at least one of MODBUS, RS232, RS485, PLC or RF technology, and TCP/IP communication protocols.

27. The system according to claim 1 wherein the data collected from any one monitoring device or metering device can be isolated and identified with said monitoring device or metering device and is assessable by a remote computer using an Internet web browser.

28. The system according to claim 1 further comprising a graphical user interface for accessing resource consumption data for said building.

29. The system according to claim 1 wherein resource consumption comprises at least one of electrical power consumption, natural gas consumption, water usage, sewer usage, and steam usage.

30. The system according to claim 1 wherein access to the system is controlled by security protocols.

31. The system according to claim 30 further comprising a password protected system wherein passwords control access to data within the system.

32. A system for storing program code, when executed, causing a computer to perform a computational method for monitoring, gathering, processing, integrating and reporting in real time resource consumption, resource delivery and equipment states for at least one building comprising:
- means for acquiring data from a plurality of monitoring devices and metering devices associated with said building resource delivery and utilization structures;
- means for storing the acquired data;
- means for acquiring field surveys of said building and infrastructure information of said building;
- means for generating a display of resource consumption for said building;
- means for sending input to building management system of said building;
- means for setting said building resource consumption based on acquired data from said plurality of monitoring devices and metering devices;
- wherein said system monitors electrical loads for building resource delivery,
- said system monitoring alternative resource services available for said one building in addition to conventional remotely supplied power; and
- said system integrating delivery of said alternative resource services with said conventional remotely supplied power.

33. The system according to claim 32 further comprising means for remotely communicating with at least one of said means for acquiring data from a plurality of monitoring devices and metering devices and said building management resource system.

34. The system according to claim 32 further comprising means for monitoring electrical loads for said building.

35. The system according to claim 34 further comprising means for sending an alert message when at least one of electrical loads and environmental conditions are outside of operating specifications.

36. The system according to claim 32 further comprising means for acquiring data about weather conditions local to said building.

* * * * *